United States Patent
Hendry et al.

(10) Patent No.: US 12,348,752 B2
(45) Date of Patent: Jul. 1, 2025

(54) IMAGE OR VIDEO CODING ON BASIS OF INFORMATION RELATED TO PICTURE OUTPUT

(71) Applicant: LG ELECTRONICS INC., Seoul (KR)

(72) Inventors: Hendry Hendry, Seoul (KR); Junghak Nam, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 17/922,718

(22) PCT Filed: May 17, 2021

(86) PCT No.: PCT/KR2021/006157
§ 371 (c)(1),
(2) Date: Nov. 1, 2022

(87) PCT Pub. No.: WO2021/235802
PCT Pub. Date: Nov. 25, 2021

(65) Prior Publication Data
US 2023/0171419 A1    Jun. 1, 2023

Related U.S. Application Data

(60) Provisional application No. 63/028,586, filed on May 22, 2020, provisional application No. 63/026,704, filed on May 18, 2020.

(51) Int. Cl.
H04N 19/46    (2014.01)
H04N 19/172   (2014.01)
(Continued)

(52) U.S. Cl.
CPC .......... *H04N 19/46* (2014.11); *H04N 19/172* (2014.11); *H04N 19/174* (2014.11); *H04N 19/70* (2014.11)

(58) Field of Classification Search
CPC .................................................. H04N 19/46
See application file for complete search history.

(56) References Cited

U.S. PATENT DOCUMENTS

2018/0160122 A1    6/2018  Xu et al.
2024/0121442 A1*   4/2024  Deshpande .......... H04N 19/188

FOREIGN PATENT DOCUMENTS

KR   101706878 B1   2/2017
KR   101729425 B1   4/2017
KR   102099915 B1   4/2020

OTHER PUBLICATIONS

Benjamin Bross, et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020. JVET-R2001-vA.

* cited by examiner

*Primary Examiner* — Jerry T Jean Baptiste
(74) *Attorney, Agent, or Firm* — Bryan Cave Leighton Paisner LLP

(57) ABSTRACT

According to the disclosure of the present document, slices included in a current picture are decoded, a picture output flag for the current picture is derived after decoding of all the slices in the current picture is completed, and an output for the current picture may be determined on the basis of the picture output flag. The current picture may be displayed as "not needed for output" on the basis of the value of the picture output flag being 0, and the current picture may be (Continued)

displayed as "needed for output" on the basis of the value of the picture output flag being 1.

16 Claims, 23 Drawing Sheets

(51) Int. Cl.
*H04N 19/174* (2014.01)
*H04N 19/70* (2014.01)

IMAGE OR VIDEO CODING ON BASIS OF INFORMATION RELATED TO PICTURE OUTPUT

CROSS-REFERENCE TO RELATED APPLICATION

This application is the National Stage filing under 35 U.S.C. 371 of International Application No. PCT/KR2021/006157, filed May 17, 2021, which claims priority to and the benefit of U.S. Provisional Application No. 63/028,586, filed May 22, 2020, and U.S. Provisional Application No. 63/026,704, filed on May 18, 2020, the disclosure of which is incorporated herein by reference in its entirety.

BACKGROUND OF DISCLOSURE

Field of the Disclosure

The present technology relates to video or image coding, for example, to a coding technique based on picture output related information.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

Additionally, there is need for a method for improving the efficiency of image/video coding, and for this purpose, a method for coding capable of effectively performing a derivation process for picture output related information is required.

SUMMARY

This document is to provide a method and apparatus for improving video/image coding efficiency.

This document is also to provide a method and apparatus for effectively deriving picture output related information in picture decoding process.

This document is also to provide a method and apparatus for effectively deriving picture output related information for a picture including slices of different NAL unit types.

According to an embodiment of this document, decoding is performed on slices included in a current picture, and the picture output flag for the current picture may be derived after all of the slices in the current picture have been decoded. Output for the current picture may be determined based on the picture output flag. For example, based on the value of the picture output flag being 0, the current picture is marked as "not needed for output", while, based on the value of the picture output flag being 1, the current picture is marked as "needed for output".

Based on all slices included in the current picture having been decoded, the picture output flag may be derived depending on at least one of the following conditions.

Based on a first condition that a value of a syntax element related to video parameter set (VPS) ID is greater than 0 and a current layer is not an output layer, the value of the picture output flag may be derived as 0.

Based on a second condition that the current picture is a random access skipped leading (RASL) picture and NoOutputBeforeRecoveryFlag of an associated intra random access point (IRAP) picture is 1, the value of the picture output flag may be derived as 0.

Based on a third condition that the current picture is a gradual decoding refresh (GDR) picture with NoOutputBeforeRecoveryFlag equal to 1, or a recovery picture of a GDR picture with NoOutputBeforeRecoveryFlag equal to 1, the value of the picture output flag may be derived as 0.

When at least one of the first condition, the second condition, and the third condition is not satisfied, the value of the picture output flag may be derived as the value of the picture output related syntax element to be signaled.

According to an embodiment of the present document, a video/image decoding method performed by a decoding apparatus is provided. The video/image decoding method may include the method disclosed in the embodiments of this document.

According to an embodiment of the present document, a decoding apparatus for performing video/image decoding is provided. The decoding apparatus may include the method disclosed in the embodiments of this document.

According to an embodiment of the present document, a video/image encoding method performed by an encoding apparatus is provided. The video/image encoding method may include the method disclosed in the embodiments of this document.

According to an embodiment of the present document, an encoding apparatus for performing video/image encoding is provided. The encoding apparatus may include the method disclosed in the embodiments of this document.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

The present document may have various effects. For example, according to an embodiment of the present document, it is possible to improve overall image/video compression efficiency. In addition, according to an embodiment of this document, in the picture decoding process, the picture output flag is derived after all slices in the picture have been decoded, thereby increasing the efficiency in the picture output related operation. In addition, according to an embodiment of this document, since a picture output flag can be effectively derived even for a picture including slices of different NAL unit types, efficiency in a picture output related operation can be increased.

Effects that can be obtained through a detailed example of the present document are not limited to the effects enumerated above. For example, there may be various technical effects that can be understood or induced by a person having ordinary skill in the related art from the present document. Accordingly, the detailed effects of the present document are not limited to those explicitly stated in the present document, but may include various effects that can be understood or induced from the technical features of the present document.

DESCRIPTION OF EMBODIMENTS

Figure 1:
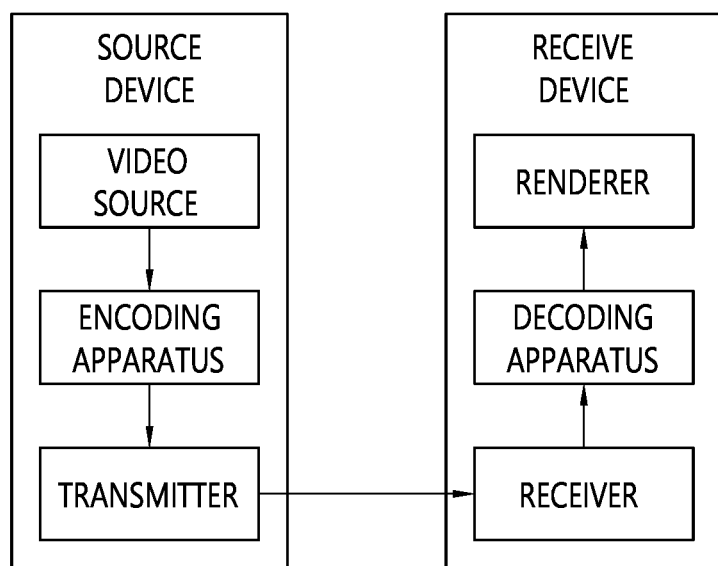
FIG. 1 briefly illustrates an example of a video/image coding device to which embodiments of the present document are applicable.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

In this document, "A or B" may mean "only A", "only B" or "both A and B". In other words, "A or B" in this document may be interpreted as "A and/or B". For example, in this document "A, B or C" means "only A", "only B", "only C", or "any combination of A, B and C".

A slash (/) or comma (,) used in this document may mean "and/or". For example, "A/B" may mean "A and/or B". Accordingly, "A/B" may mean "only A", "only B", or "both A and B". For example, "A, B, C" may mean "A, B, or C".

In this document, "at least one of A and B" may mean "only A", "only B" or "both A and B". Also, in this document, the expression "at least one of A or B" or "at least one of A and/or B" means "at least one It can be interpreted the same as "at least one of A and B".

Also, in this document, "at least one of A, B and C" means "only A", "only B", "only C", or "A, B and C" Any combination of A, B and C". Also, "at least one of A, B or C" or "at least one of A, B and/or C" means may mean "at least one of A, B and C".

Also, parentheses used in this document may mean "for example". Specifically, when "prediction (intra prediction)" is indicated, "intra prediction" may be proposed as an example of "prediction". In other words, "prediction" in this document is not limited to "intra prediction", and "intra prediction" may be proposed as an example of "prediction". Also, even when "prediction (i.e., intra prediction)" is indicated, "intra prediction" may be proposed as an example of "prediction".

The present document relates to video/image coding. For example, a method/embodiment disclosed in the present document may be applied to a method disclosed in the versatile video coding (VVC) standard. In addition, a method/embodiment disclosed in the present document may be applied to a method disclosed in the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. A tile is a rectangular region of CTUs within a particular tile column and a particular tile row in a picture (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice includes an integer number of complete tiles or an integer number of consecutive complete CTU rows within a tile of a picture that may be exclusively contained in a single NAL unit.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Also, in this document, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In this document, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of this document as well.

Technical features that are individually described in one drawing in this document may be implemented individually or may be implemented at the same time.

Hereinafter, preferred embodiments of this document are described more specifically with reference to the accompanying drawings. Hereinafter, in the drawings, the same reference numeral is used in the same element, and a redundant description of the same element may be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded video/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
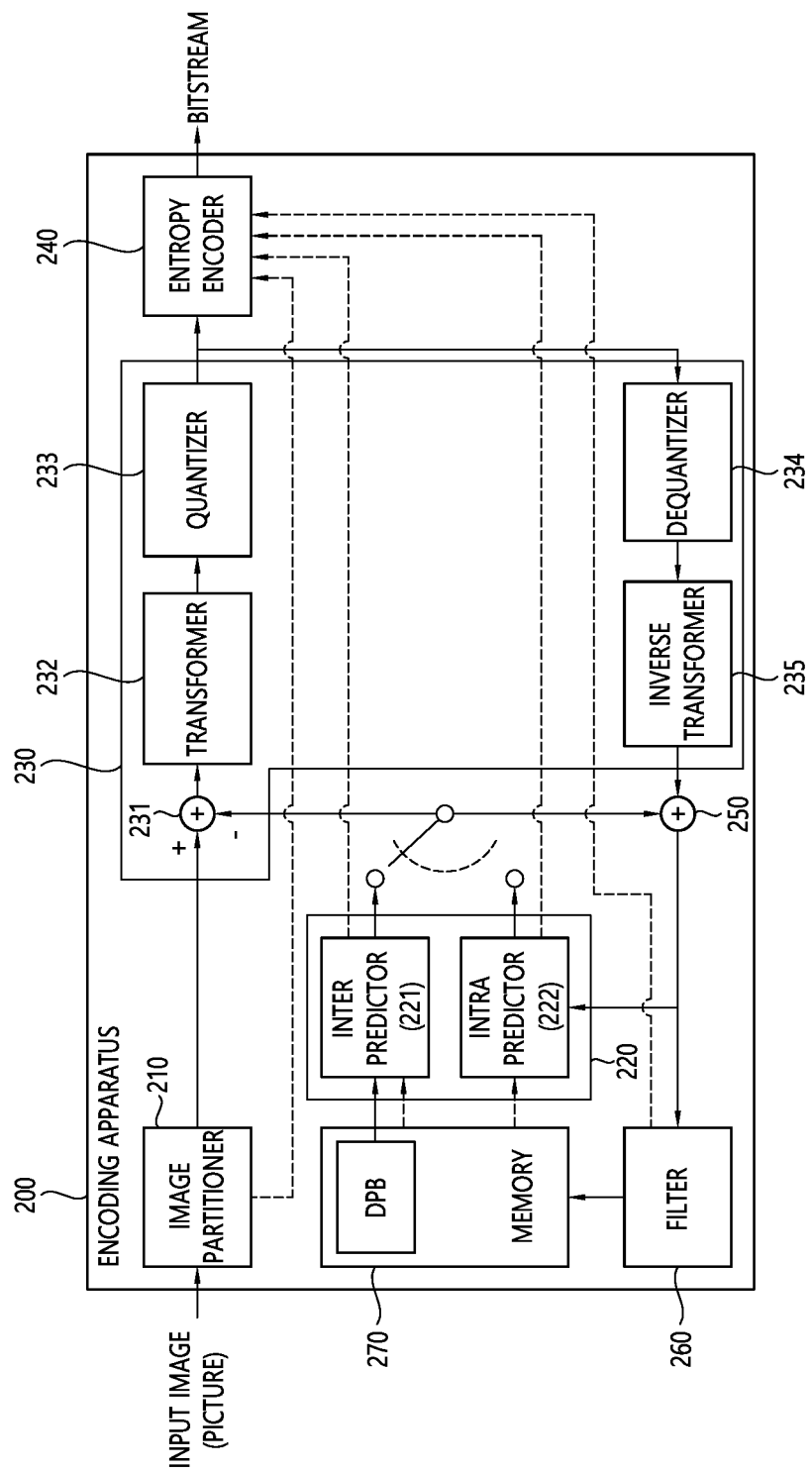
FIG. 2 is a schematic diagram illustrating a configuration of a video/image encoding apparatus to which the embodiment(s) of the present document may be applied.

FIG. 2 is a diagram schematically illustrating a configuration of a video/image encoding apparatus to which the embodiments of the present document may be applied. Hereinafter, what is referred to as the encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
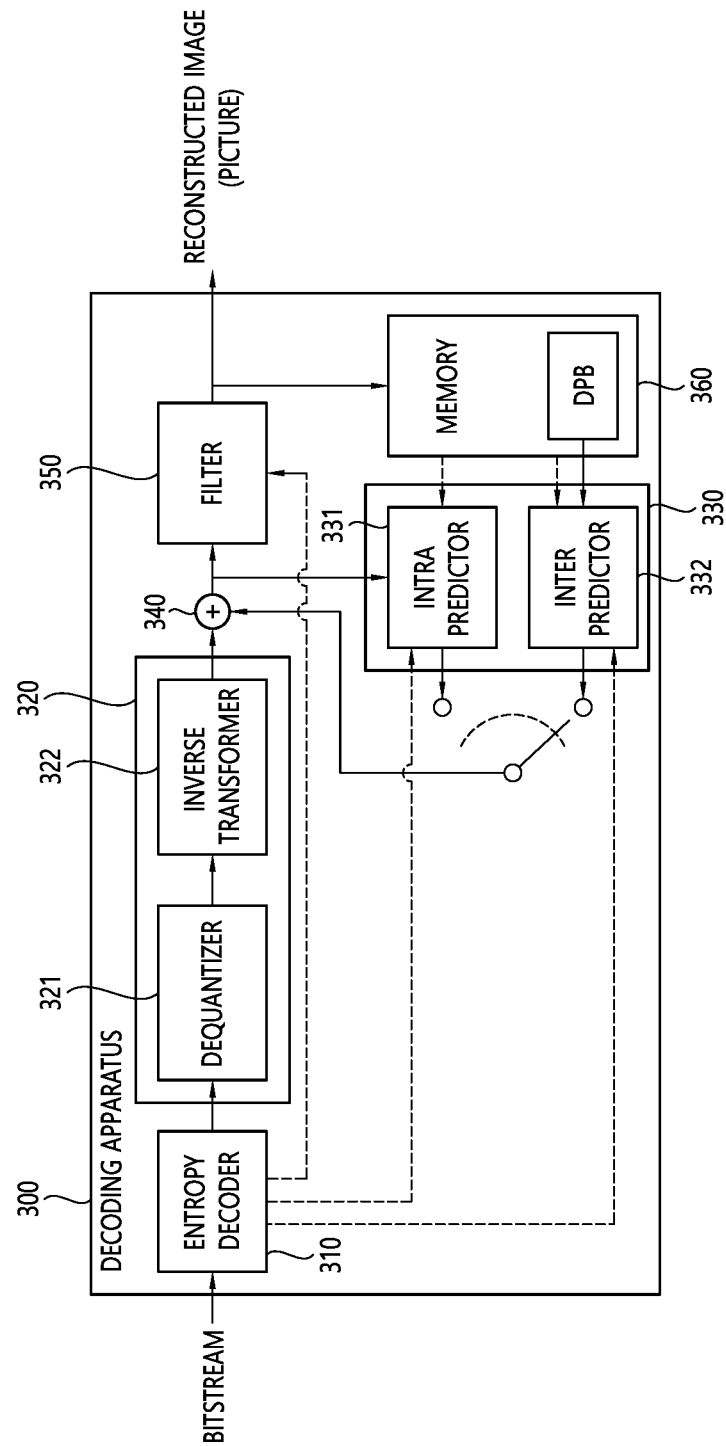
FIG. 3 is a schematic diagram illustrating a configuration of a video/image decoding apparatus to which the embodiment(s) of the present document may be applied.

FIG. 3 is a diagram for schematically explaining a configuration of a video/image decoding apparatus to which the embodiments of the present document may be applied. Hereinafter, what is referred to as the decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present document, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

As described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Meanwhile, as described above, the intra prediction or the inter prediction may be applied when the prediction is performed on the current block. In an embodiment, when the inter prediction is applied to the current block, the predictor (more specifically, the inter predictor) of the encoding/decoding apparatus may derive prediction samples by performing inter prediction in units of blocks. The inter prediction may indicate prediction derived in a method dependent on data elements (e.g., sample values, motion information, etc.) of a picture or pictures other than the current picture. When inter prediction is applied to the current block, a predicted block (prediction sample array) for the current block may be derived based on a reference block (reference sample array) specified by a motion vector on a reference picture which a reference picture index indicates. At this time, in order to reduce the amount of motion information transmitted in the inter prediction mode, the motion information of the current block may be predicted in units of blocks, subblocks, or samples, based on correlation of motion information between the neighboring block and the current block. Motion information may include a motion vector and a reference picture index. Motion information may further include inter prediction type (L0 prediction, L1 prediction, Bi prediction, etc.) information. When inter prediction is applied, the neighboring block may include a spatial neighboring block existing in the current picture and a temporal neighboring block existing in the reference picture. The reference picture including the reference block, and the reference picture including the temporal neighboring block may be the same to each other or different from each other. The temporal neighboring block may be called a collocated reference block, a collocated CU (colCU), and the like, and the reference picture including the temporal neighboring block may be called a collocated picture (colPic). For example, motion information candidate list may be configured based on neighboring blocks of the current block, and a flag or index information indicating which candidate is selected (used) in order to derive a motion vector and/or a reference picture index of the current block may be signaled. Inter prediction may be performed based on various prediction modes. For example, in the case of a skip mode and a merge mode, motion information of the current block may be the same as motion information of the selected neighboring block. In the skip mode, unlike the merge mode, the residual signal may not be transmitted. In the case of motion information prediction (motion vector prediction (MVP)) mode, a motion vector of the selected neighboring block may be used as a motion vector predictor, and a motion vector difference may be signaled. In this case, a motion vector of the current block may be derived using the sum of the motion vector predictor and motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Figure 4:
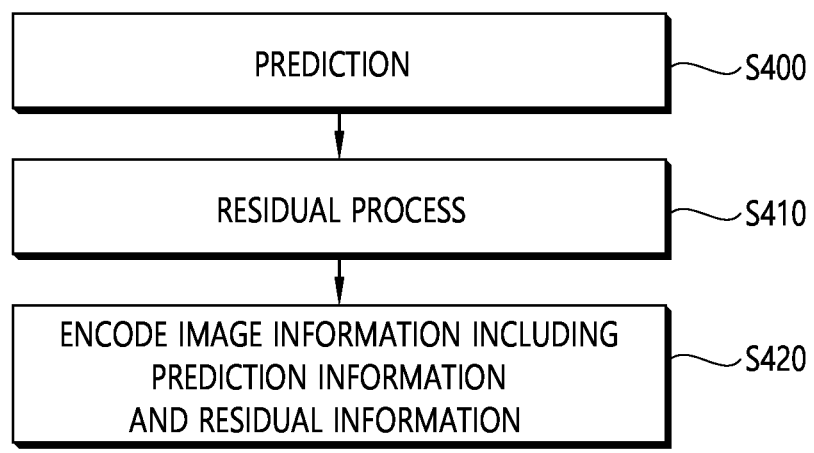
FIG. 4 represents an example of a schematic video/image encoding process to which an embodiment or embodiments of this document can be applied.

Referring to FIG. 4, the video/image encoding procedure may schematically include a procedure of generating the reconstructed picture for the current picture and a procedure (optional) of applying the in-loop filtering to the reconstructed picture as well as a procedure of encoding information (e.g., prediction information, residual information, or partitioning information) for reconstructing the picture to output the encoded information in the form of the bitstream as described with reference to FIG. 2.

The encoding apparatus may derive (modified) residual samples from the quantized transform coefficient by the dequantizer 234 and the inverse transformer 235, and generate the reconstructed picture based on the predicted samples which are the output in S400 and the (modified) residual samples. The thus generated reconstructed picture may be the same as the aforementioned reconstructed picture generated by the decoding apparatus. The modified reconstructed picture may be generated by the in-loop filtering procedure for the reconstructed picture, and may be stored in the decoding picture buffer or the memory 270, and as in the case of the decoding apparatus, used as the reference picture in the inter prediction procedure upon encoding the picture later. As described above, in some cases, some or all of the in-loop filtering procedure may be omitted. If the in-loop filtering procedure is performed, the (in-loop) filtering-related information (parameter) is encoded by the entropy encoder 240 and outputted in the form of the bitstream, and the decoding apparatus may perform the in-loop filtering procedure in the same method as that of the encoding apparatus based on the filtering-related information.

It is possible to reduce noises generated upon coding the image/the video, such as blocking artifact and ringing artifact by the in-loop filtering procedure, and to enhance subjective/objective visual qualities. Further, by performing the in-loop filtering procedure both in the encoding apparatus and the decoding apparatus, the encoding apparatus and the decoding apparatus may derive the same prediction results, increase reliability of the picture coding, and reduce an amount of data to be transmitted for coding the picture.

As described above, the picture reconstruction procedure may be performed in the encoding apparatus as well as in the decoding apparatus. The reconstructed block may be generated based on the intra prediction/the inter prediction in units of each block, and the reconstructed picture including the reconstructed blocks may be generated. If a current picture/slice/tile group is an I picture/slice/tile group, blocks included in the current picture/slice/tile group may be reconstructed based on only the intra prediction. Meanwhile, if the current picture/slice/tile group is a P or B picture/slice/tile group, blocks included in the current picture/slice/tile group may be reconstructed based on the intra prediction or the inter prediction. In this case, the inter prediction may be applied to some blocks in the current picture/slice/tile group, and the intra prediction may also be applied to other blocks. A color component of the picture may include a luma component and a chroma component, and the methods and exemplary embodiments proposed in the present document may be applied to the luma component and the chroma component unless explicitly limited in the present document.

Figure 5:
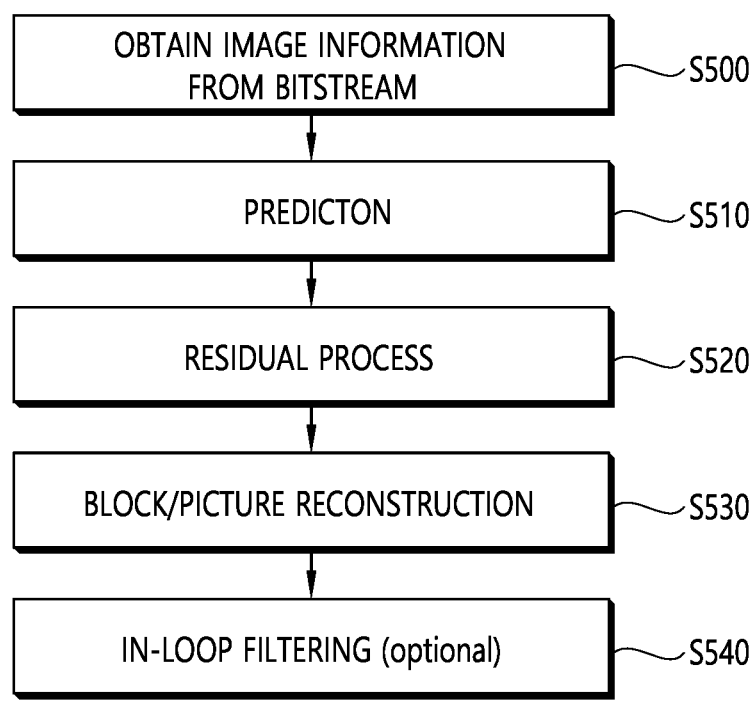
FIG. 5 represents an example of a schematic video/image decoding process to which an embodiment or embodiments of this document can be applied.

FIG. 5 represents an example of a schematic video/image decoding process to which an embodiment or embodiments of this document can be applied. In FIG. 5, S500 may be performed in the entropy decoder 310 of the decoding apparatus described above in FIG. 3; S510 may be performed in the predictor 330; S520 may be performed in the residual processor 320; S530 may be performed in the adder 340; and S540 may be performed in the filter 350. S500 may include the information decoding process described in the present document; S510 may include the inter/intra prediction process described in the present document; S520 may include the residual processing process described in the present document; S530 may include the block/picture reconstruction process described in the present document; and S540 may include the in-loop filtering process described in the present document.

Referring to FIG. 5, as represented in the description with regard to FIG. 3, the picture decoding process may schematically include an image/video information obtaining process S500 from a bitstream (through decoding), a picture reconstruction process S510 to S530, and an in-loop filtering process S540 for the reconstructed picture. The picture reconstruction process may be performed based on the residual samples and the prediction samples obtained through the inter/intra prediction S510 and the residual processing S520 (dequantization for the quantized transform coefficient, inverse transform) process described in the present document. Through the in-loop filtering process for the reconstructed picture which has been generated though the picture reconstruction process, a modified reconstructed picture may be generated, which may be output as a decoded picture, and may also be stored in the decoding picture buffer or a memory 360 of the decoding apparatus and be used as a reference picture in the inter prediction process of the later picture decoding.

According to circumstances, the in-loop filtering process may be skipped, and in this case, the reconstructed picture may be output as a decoded picture, and may also be stored in the decoding picture buffer or a memory 360 of the decoding apparatus and be used as a reference picture in the inter prediction process of the later picture decoding. The in-loop filtering process S540 may include the deblocking filtering process, the sample adaptive offset (SAO) process, the adaptive loop filter (ALF) process, and/or the bi-lateral filter process as described above, and all or some of them may be skipped. Further, one or some of the deblocking filtering process, the sample adaptive offset (SAO) process, the adaptive loop filter (ALF) process, and the bi-lateral filter processes may be sequentially applied, or all of them may be sequentially applied. For example, after the deblocking filtering process is applied to the reconstructed picture, the SAO process may be performed thereon. Alternatively, for example, after the deblocking filtering process is applied to the reconstructed picture, the ALF process may be performed thereon. This may be likewise performed in the encoding apparatus.

Meanwhile, as described above, the encoding apparatus performs entropy encoding based on various encoding methods such as, for example, exponential Golomb, context-adaptive variable length coding (CAVLC), context-adaptive binary arithmetic coding (CABAC) and the like. Also, the decoding apparatus may perform entropy decoding based on a coding method such as exponential Golomb coding, CAVLC, or CABAC. Hereinafter, an entropy encoding/decoding process will be described.

Figure 6:
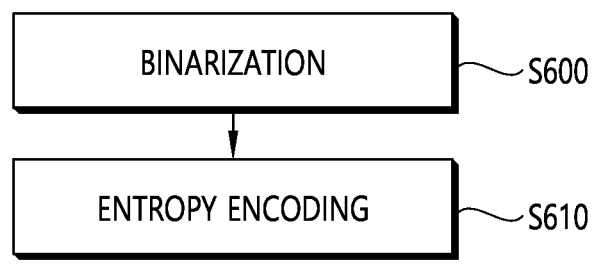
FIG. 6 schematically illustrates an example of an entropy encoding method to which embodiments of this document are applicable, and FIG. 7 schematically illustrates an entropy encoder in an encoding apparatus.
Figure 7:
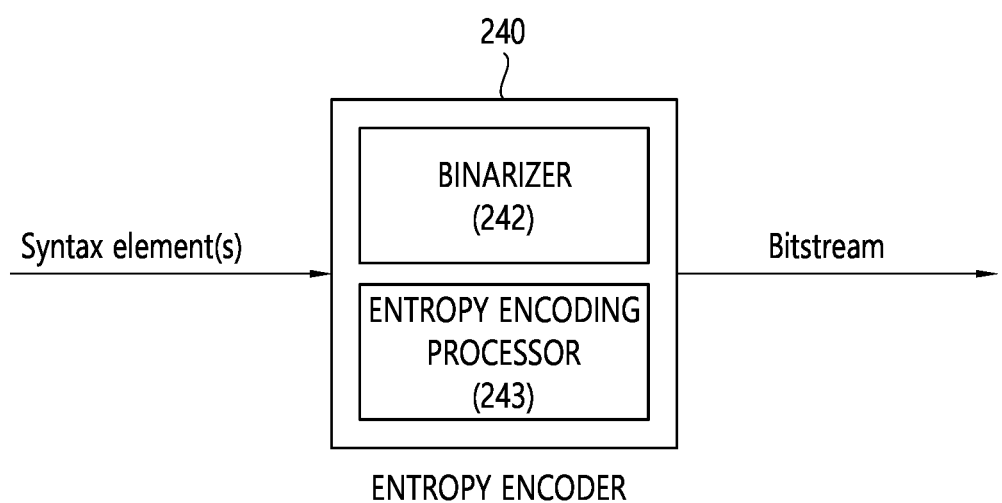

FIG. 6 schematically illustrates an example of an entropy encoding method to which embodiments of this document are applicable, and FIG. 7 schematically illustrates an entropy encoder in an encoding apparatus. The entropy encoder in the encoding apparatus of FIG. 7 may also be equally or correspondingly applied to the above-described entropy encoder 240 of the encoding apparatus 200 of FIG. 2.

Referring to FIGS. 6 and 7, the encoding apparatus (entropy encoder) performs an entropy coding process on image/video information. The image/video information may include partitioning-related information, prediction-related information (e.g., inter/intra prediction distinguishing information, intra prediction mode information, inter prediction mode information, or the like), residual information, in-loop filtering-related information, or may include various syntax elements related to them. The entropy coding may be performed in syntax element units. S600 and S610 may be performed by the above-described entropy encoder 240 of the encoding apparatus 200 of FIG. 2.

The encoding apparatus may perform binarization on a target syntax element (S600). Here, the binarization may be based on various binarization methods such as Truncated Rice binarization process, Fixed-length binarization process, and the like, and the binarization method for the target syntax element may be predefined. The binarization process may be performed by a binarizer 242 in the entropy encoder 240.

The encoding apparatus may perform entropy encoding on the target syntax element (S610). The encoding apparatus may regular coding-based (context-based) or bypass coding-based encode a bin string of the target syntax element based on a entropy coding scheme such as context-adaptive arithmetic coding (CABAC) or context-adaptive variable length coding (CAVLC), and the output thereof may be incorporated into the bitstream. The entropy encoding process may be performed by an entropy encoding processor 243 in the entropy encoder 240. As described above, the bitstream may be transferred to the decoding apparatus through a (digital) storage medium or a network.

Figure 8:
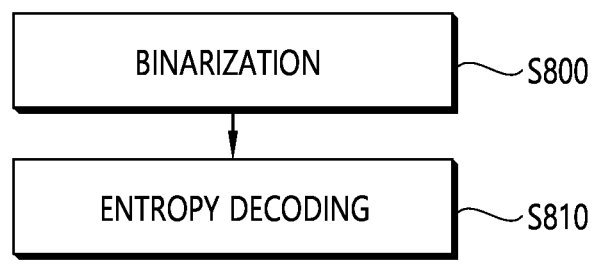
FIG. 8 schematically illustrates an example of an entropy decoding method to which embodiments of the present document are applicable, and FIG. 9 schematically illustrates an entropy decoder in a decoding apparatus.
Figure 9:
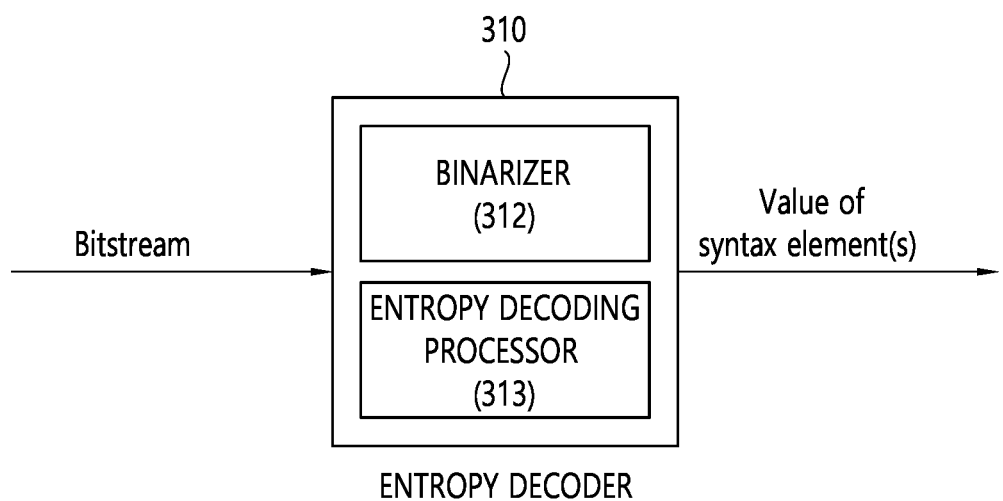

FIG. 8 schematically illustrates an example of an entropy decoding method to which embodiments of the present document are applicable, and FIG. 9 schematically illustrates an entropy decoder in a decoding apparatus. The entropy decoder in the decoding apparatus of FIG. 9 may also be equally or correspondingly applied to the above-described entropy decoder 310 of the decoding apparatus 300 of FIG. 3.

Referring to FIGS. 8 and 9, a decoding apparatus (entropy decoder) may decode encoded image/video information. The image/video information may include partitioning-related information, prediction-related information (e.g., inter/intra prediction distinguishing information, intra prediction mode information, inter prediction mode information, or the like), residual information, in-loop filtering-related information, or may include various syntax elements related to them. The entropy coding may be performed in syntax element units. S800 and S810 may be performed by the above-described entropy decoder 310 of the decoding apparatus 300 of FIG. 3.

The decoding apparatus may perform binarization on a target syntax element (S800). Here, the binarization may be based on various binarization methods such as Truncated Rice binarization process, Fixed-length binarization process, and the like, and the binarization method for the target syntax element may be predefined. The decoding apparatus may derive enabled bin strings (bin string candidates) for enabled values of the target syntax element through the binarization process. The binarization process may be performed by a binarizer 312 in the entropy decoder 310.

The decoding apparatus may perform entropy decoding on the target syntax element (S810). While decoding and parsing sequentially each bin for the target syntax element from the input bit(s) in the bitstream, the decoding apparatus compares the derived bin string with enabled bin strings for the corresponding syntax element. When the derived bin string is the same as one of the enabled bin strings, the value corresponding to the bin string may be derived as a value of the syntax element. If not, the above-described process may be performed again after further parsing the next bit in the bitstream. Through these processes, even without using a start bit or an end bit for specific information (specific syntax element) in a bitstream, the decoding apparatus may signal the information using a variable length bit. Through this, relatively less bits may be assigned to a low value, thereby increasing an overall coding efficiency.

The decoding apparatus may perform context-based or bypass-based decoding on respective bins in the bin string from a bitstream based on an entropy coding technique such as CABAC, CAVLC or the like. In this connection, the bitstream may include various information for image/video decoding as described above. As described above, the bitstream may be transferred to the decoding apparatus through a (digital) storage medium or a network.

In this document, a table (syntax table) including syntax elements may be used to indicate signaling of information from the encoding apparatus to the decoding apparatus. An order of syntax elements in a table including the syntax elements used in this document may indicate a parsing order of syntax elements from a bitstream. The encoding apparatus may construct and encode the syntax table so that the syntax elements can be parsed by the decoding apparatus in a parsing order, while the decoding apparatus may obtain values of the syntax elements by parsing and decoding the syntax elements of the corresponding syntax table from the bitstream according to the parsing order.

Figure 10:
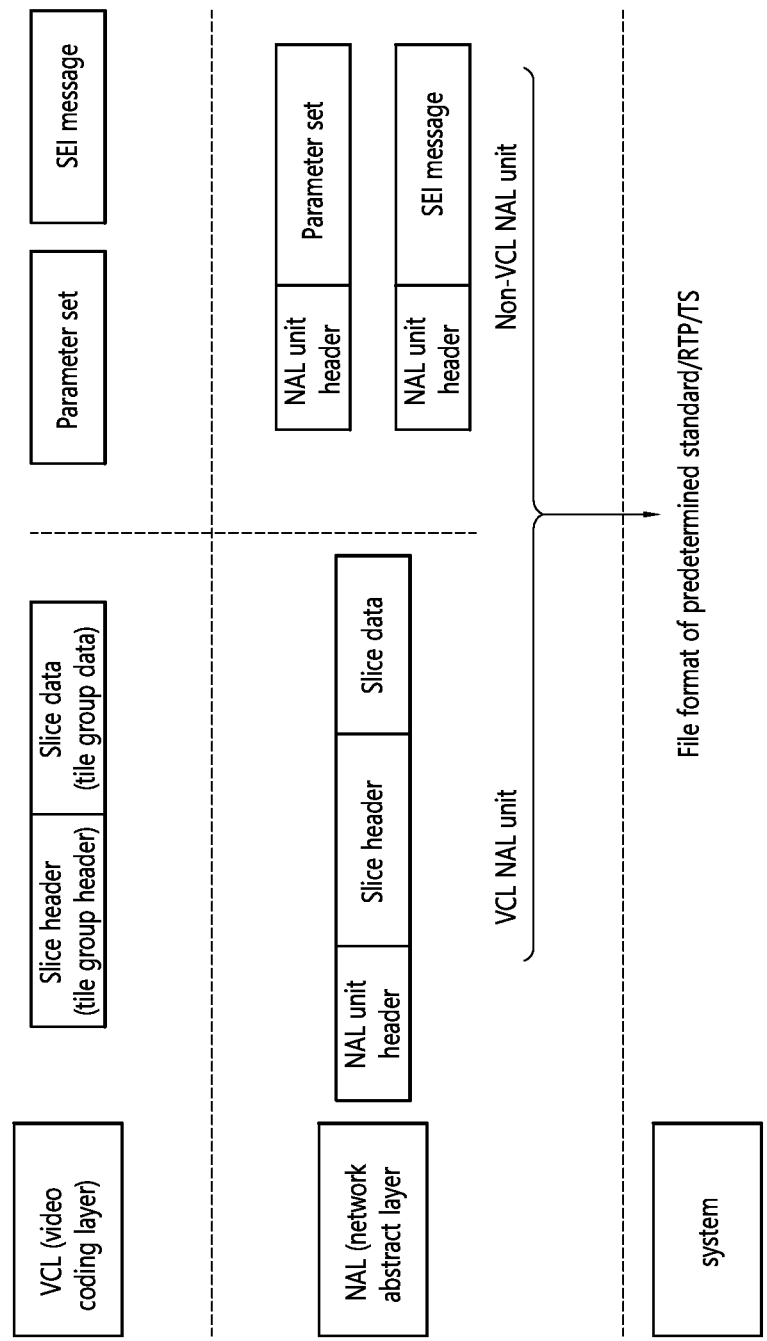
FIG. 10 exemplarily represents a hierarchical structure for a coded image/video.

FIG. 10 exemplarily shows a hierarchical structure for a coded image/video.

Referring to FIG. 10, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

Additionally, the NAL unit may be divided into a VCL NAL unit and a Non-VCL NAL unit according to the RBSP generated in the VCL. The VCL NAL unit may refer to a NAL unit including information on an image (slice data), and the Non-VCL NAL unit may refer to a NAL unit including information (parameter set or SEI message) required to decode an image.

The VCL NAL unit and Non-VCL NAL unit may be transmitted through a network by attaching header information according to a data standard of the subsystem. For example, the NAL unit may be transformed into a data form of a predetermined standard, such as an H.266/VVC file format, a Real-time Transport Protocol (RTP), and a Transport Stream (TS), etc., and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

DCI (Decoding capability information) NAL unit: Type for NAL unit including DCI

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

APS (Adaptation Parameter Set) NAL unit: Type for NAL unit including APS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameter which may be commonly applied to the picture. The slice header (slice header syntax) may include information/parameter which may be commonly applied to the slice. The APS (APS syntax) or PPS (PPS syntax) may include information/parameter which may be commonly applied to one or more slices or pictures. The SPS (SPS syntax) may include information/parameter commonly which may be applied to one or more sequences. The VPS (VPS syntax) may include information/parameter which may be commonly applied to multiple layers. The DCI (DCI syntax) may include information/parameter which may be commonly applied across video. DCI may include information/parameters related to decoding capability. In this document, high level syntax (HLS) may include at least one of the APS syntax, PPS syntax, SPS syntax, VPS syntax, DCI syntax, picture header syntax and slice header syntax. Meanwhile, in this document, low level syntax (LLS) may include, for example, slice data syntax, CTU syntax, coding unit syntax, transform unit syntax, and the like.

Meanwhile, in this document, a tile group may be used interchangeably or replaced with a slice or a picture. Also, in this document, the tile group header may be used interchangeably or replaced with a slice header or a picture header.

Herein, image/video information, which is encoded and signaled in the form of a bitstream from the encoding apparatus to the decoding apparatus, may include not only intra-picture partitioning-related information, intra/inter prediction information, residual information, in-loop filtering information, etc., but also include information of the slice header, information of the picture header, information of the APS, information of the PPS, information of the SPS, and/or information of the DCI. In addition, the image/video information may further include general constraint information and/or information of a NAL unit header.

As described above, the high level syntax (HLS) may be coded/signaled for video/image coding. In this document, video/image information may include the HLS, and the video/image coding method may be performed based on the video/image information. For example, a picture being coded may be constructed with one or more slices. Parameters describing the picture being coded may be signaled in a picture header (PH), and parameters describing a slice may be signaled in a slice header (SH). The PH may be transmitted in its own NAL unit type. The SH may be present at the start portion of a NAL unit including a payload of a slice (i.e., slice data). Details of the syntax and semantics of the PH and the SH may be as disclosed in the VVC standard. Each picture may be associated with a PH. A picture may be constructed with different types of slices: intra-coded slices (i.e., I slices) and inter-coded slices (i.e., P-slice and B-slice). As a result, the PH may include syntax elements necessary for an intra slice of a picture and an inter slice of a picture.

Meanwhile, in general, one NAL unit type may be set for one picture. The NAL unit type may be signaled through nal_unit_type in a NAL unit header of a NAL unit including a slice. nal_unit_type is syntax information for specifying the NAL unit type, that is, as shown in Table 1 or Table 2 below, may specify the type of the RBSP data structure included in the NAL unit.

Table 1 below shows an example of a NAL unit type code and a NAL unit type class.

TABLE 1

| nal_unit_type | Name of nal_unit_type | Content of NAL unit and RBSP syntax structure | NAL unit type class |
| --- | --- | --- | --- |
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |

TABLE 1-continued

| nal_unit_type | Name of nal_unit_type | Content of NAL unit and RBSP syntax structure | NAL unit type class |
|---|---|---|---|
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28...31 | UNSPEC_28...UNSPEC_31 | Unspecified non-VCL NAL unit types | non-VCL |

Alternatively, as an example, a NAL unit type code and a NAL unit type class may be defined as shown in Table 2 below.

TABLE 2

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4...6 | RSV_VCL_4...RSV_VCL_6 | Reserved non-IRAP VCL NAL unit types | VCL |
| 7 | IDR_W_RADL | Coded slice of an IDR picture or subpicture* slice_layer_rbsp( ) | VCL |
| 8 | IDR_N_LP | | |
| 9 | CRA_NUT | Coded slice of a CRA picture or subpicture* slice_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit type | VCL |
| 12 | OPI_NUT | Operating point information operating_point_information_rbsp( ) | non-VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28...31 | UNSPEC_28...UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

As shown in Table 1 or Table 2, the name of the NAL unit type and its value may be specified according to the RBSP data structure included in the NAL unit, and may be classified into a VCL NAL unit type and a Non-VCL NAL unit type according to whether the NAL unit includes information on image (slice data). The VCL NAL unit type may be classified depending on properties, kinds and the like of pictures, and the Non-VCL NAL unit type may be classified depending on kinds and the like of parameter sets. For example, NAL unit types may be specified according to the properties and kinds of pictures included in the VCL NAL unit as follows.

TRAIL: It indicates a type for a NAL unit including coded slice data of a trailing picture/subpicture. For example, nal_unit_type may be defined as TRAIL_NUT, and the value of nal_unit_type may be specified as 0.

Here, the trailing picture refers to a picture that follows a picture that can be accessed randomly in output order and decoding order. A trailing picture may be a non-IRAP picture that follows the associated IRAP picture in output order and is not an STSA picture. For example, trailing pictures associated with an IRAP picture follow the IRAP picture in decoding order. Pictures that follow the associated IRAP picture in output order and precede the associated IRAP picture in decoding order are not allowed.

STSA (Step-wise Temporal Sub-layer Access): It indicates a type for a NAL unit including coded slice data of an STSA picture/subpicture. For example, nal_unit_type may be defined as STSA_NUT, and the value of nal_unit_type may be specified as 1.

Here, the STSA picture is a picture that can be switched between temporal sublayers in a bitstream supporting temporal scalability, and is a picture indicating a position where up-switching is possible from a lower sub-layer to an upper sub-layer one step higher than the lower sub-layer. The STSA picture does not use TemporalId same as STSA picture and the picture in the same layer as the STSA picture for inter prediction reference. Pictures following the STSA picture in the same layer and the same TemporalId as the STSA picture in decoding order do not use the picture before the STSA picture in the same layer and the same TemporalId as the STSA picture in decoding order for inter prediction reference. The STSA picture enables in the STSA picture the up-switching from the immediately lower sublayer to the sublayer including the STSA picture. In this case, the picture being coded must not belong to the lowest sublayer. That is, STSA pictures must always have a TemporalId greater than 0.

RADL (random access decodable leading (picture)): It indicates a type for a NAL unit including slice data being coded of a RADL picture/subpicture. For example, nal_unit_ type may be defined as RADL_NUT, and the value of nal_unit_type may be specified as 2.

Here, all RADL pictures are leading pictures. The RADL picture is not used as a reference picture for the decoding process of trailing pictures of the same associated IRAP picture. Specifically, a RADL picture having a nuh_layer_id equal to layerId is a picture that follows an IRAP picture associated with a RADL picture in output order, and is not used as a reference picture for the decoding process of a picture having a nuh_layer_id equal to layerId. When field_seq_flag (i.e., sps_field_seq_flag) is 0, all RADL pictures precede all non-leading pictures of the same associated IRAP picture in decoding order (i.e., if a RADL picture is present). Meanwhile, the leading picture refers to a picture preceding the related IRAP picture in output order.

RASL (random access skipped leading (picture)): It indicates a type for a NAL unit including slice data being coded of a RASL picture/subpicture. For example, nal_unit_type may be defined as RASL_NUT, and the value of nal_unit_ type may be specified as 3.

Here, all RASL pictures are leading pictures of the associated CRA picture. When the associated CRA picture has NoOutputBeforeRecoveryFlag whose value is 1, the RASL picture may neither be output nor correctly decoded since the RASL picture may include references to pictures that is not present in the bitstream. A RASL picture is not used as a reference picture for the decoding process of a non-RASL picture of the same layer. However, the RADL subpicture in the RASL picture of the same layer may be used for inter prediction for the collocated RADL subpicture in the RADL picture associated with the same CRA picture as the RASL picture. When field_seq_flag (i.e., sps_field_ seq_flag) is 0, all RASL pictures precede all non-leading pictures of the same associated CRA picture in decoding order (i.e., if the RASL picture is present).

There may be a reserved nal_unit_type for the non-IRAP VCL NAL unit type. For example, nal_unit_type may be defined as RSV_VCL_4 to RSV_VCL_6, and values of nal_unit_type may be specified as 4 to 6, respectively.

Here, an intra random access point (IRAP) is information indicating a NAL unit for a picture capable of random access. The IRAP picture may be a CRA picture or an IDR picture. For example, the IRAP picture refers to a picture having a NAL unit type in which nal_unit_type is defined as IDR_W_RADL, IDR_N_LP, and CRA_NUT, as in Table 1 or Table 2 above, and the values of nal_unit_type may be specified as 7 to 9, respectively.

IRAP pictures do not use any reference picture in the same layer for inter prediction in the decoding process. In other words, the IRAP picture does not reference any picture other than itself for inter prediction in the decoding process. The first picture in the bitstream in decoding order becomes an IRAP or GDR picture. For a single-layer bitstream, if the necessary parameter set is available when there is a need to reference it, all following non-RASL pictures and IRAP pictures of a coded layer video sequence (CLVS) in decoding order can be accurately decoded without performing the decoding process of pictures preceding the IRAP picture in decoding order.

The value of mixed_nalu_types_in_pic_flag for an IRAP picture is 0. When the value of mixed_nalu_types_in_pic_ flag for the picture is 0, one slice in the picture may have a NAL unit type (nal_unit_type) within the range from IDR_ W_RADL to CRA_NUT (e.g., the value of the NAL unit type in Table 1 or Table 2 is 7 to 9), and all other slices in the picture may have the same NAL unit type (nal_unit_ type). In this case, the picture may be regarded as an IRAP picture.

Instantaneous decoding refresh (IDR): It indicates a type for a NAL unit including slice data being coded of an IDR picture/subpicture. For example, nal_unit_type for an IDR picture/subpicture may be defined as IDR_W_RADL or IDR_N_LP, and values of nal_unit_type may be specified as 7 or 8, respectively.

Here, the IDR picture may not use inter prediction in the decoding process (that is, it does not reference pictures other than itself for inter prediction), but may become the first picture in decoding order in the bitstream, or may appear later (i.e., not first, but later) in the bitstream. Each IDR picture is the first picture of a coded video sequence (CVS) in decoding order. For example, when the IDR picture has an association with the decodable leading picture, the NAL unit type of the IDR picture may be represented as IDR_W_RADL, while, when the IDR picture has no association with the leading picture, the NAL unit type of the IDR picture may be represented as IDR_N_LP. That is, an IDR picture whose NAL unit type is IDR_W_RADL may not have an associated RASL picture existing in the bitstream, but may have an associated RADL picture in the bitstream. An IDR picture whose NAL unit type is IDR_N_LP does not have an associated leading picture present in the bitstream.

Clean random access (CRA): It indicates a type for a NAL unit including slice data being coded of a CRA picture/subpicture. For example, nal_unit_type may be defined as CRA_NUT, and the value of nal_unit_type may be specified as 9.

Here, the CRA picture may not use inter prediction in the decoding process (that is, it does not reference pictures other than itself for inter prediction), but may become the first picture in decoding order in the bitstream, or may appear later (i.e., not first, but later) in the bitstream. The CRA picture may have an associated RADL or RASL picture present in the bitstream. For a CRA picture in which the value of NoOutputBeforeRecoveryFlag is 1, the associated RASL pictures may not be output by the decoder. This is because it is not possible to decode in this case due to the inclusion of reference to a picture that is not present in the bitstream.

Gradual decoding refresh (GDR): It indicates a type for a NAL unit including slice data being coded of a GDR picture/subpicture. For example, nal_unit_type may be defined as GDR_NUT, and the value of nal_unit_type may be specified as 10.

Here, the value of pps_mixed_nalu_types_in_pic_flag for the GDR picture may be 0. When the value of pps_mixed_nalu_types_in_pic_flag is 0 for the picture and one slice in the picture has a NAL unit type of GDR_NUT, all other slices in the picture have the same value of the NAL unit type (nal_unit_type), and in this case, the picture may become a GDR picture after receiving the first slice.

Also, for example, NAL unit types may be specified according to the kinds of parameters included in the Non-VCL NAL unit, and, as shown in Table 1 or Table 2 above, NAL unit types (nal_unit_type) such as VPS_NUT indicating a type for a NAL unit including a video parameter set, SPS_NUT indicating a type for a NAL unit including a sequence parameter set, PPS_NUT indicating the type for the NAL unit including the picture parameter set, and PH_NUT indicating the type for the NAL unit including the picture header may be included.

Meanwhile, a bitstream (or temporal scalable bitstream) supporting temporal scalability includes information on a temporally scaled temporal layer. The information on the temporal layer may be identification information of the temporal layer specified according to the temporal scalability of the NAL unit. For example, identification information of the temporal layer may use temporal_id syntax information, and the temporal_id syntax information may be stored in a NAL unit header in an encoding apparatus, and signaled to a decoding apparatus. Hereinafter, in the present specification, the temporal layer may be referred to as a sub-layer, a temporal sub-layer, a temporal scalable layer, or the like.

Figure 11:
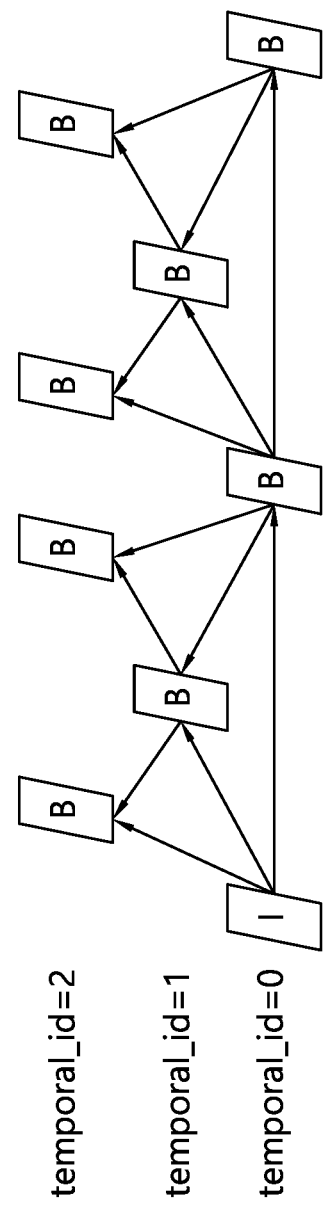
FIG. 11 is a diagram showing a temporal layer structure for NAL units in a bitstream supporting temporal scalability.

FIG. 11 is a diagram showing a temporal layer structure for NAL units in a bitstream supporting temporal scalability.

When the bitstream supports temporal scalability, NAL units included in the bitstream have identification information (e.g., temporal_id) of the temporal layer. As an example, the temporal layer constructed with NAL units whose temporal_id value is 0 may provide the lowest temporal scalability, and a temporal layer constructed with NAL units whose temporal_id value is 2 may provide the highest temporal scalability.

In FIG. 11, a box marked with I refers to an I picture, and a box marked with B refers to a B picture. In addition, an arrow indicates a reference relationship with respect to whether a picture references another picture.

As shown in FIG. 11, NAL units of a temporal layer whose temporal_id value is 0 are reference pictures that can be referenced by NAL units of a temporal layer whose temporal_id value is 0, 1, or 2. NAL units of a temporal layer whose temporal_id value is 1 are reference pictures that can be referenced by NAL units of a temporal layer whose temporal_id value is 1 or 2. NAL units of a temporal layer whose temporal_id value is 2 may be reference pictures that NAL units of the same temporal layer, that is, a temporal layer whose temporal_id value is 2, can reference, or may be non-reference pictures that are not referenced by other pictures.

If, as shown in FIG. 11, NAL units of a temporal layer whose a temporal_id value is 2, that is, the highest temporal layer, are non-reference pictures, these NAL units are extracted (or removed) from the bitstream without affecting other pictures in the decoding process.

Meanwhile, among the above-described NAL unit types, IDR and CRA types are information indicating a NAL unit including a picture capable of random access (or splicing), that is, a random access point (RAP) or intra random access point (IRAP) picture serving as a random access point. In other words, the IRAP picture may be the IDR or CRA picture, and may include only I slices. In the bitstream, the first picture in decoding order becomes an IRAP picture.

If an IRAP picture (IDR, CRA picture) is included in the bitstream, there may be a picture that precedes the IRAP picture in output order but follows it in decoding order. These pictures are referred to as leading pictures (LP).

Figure 12:
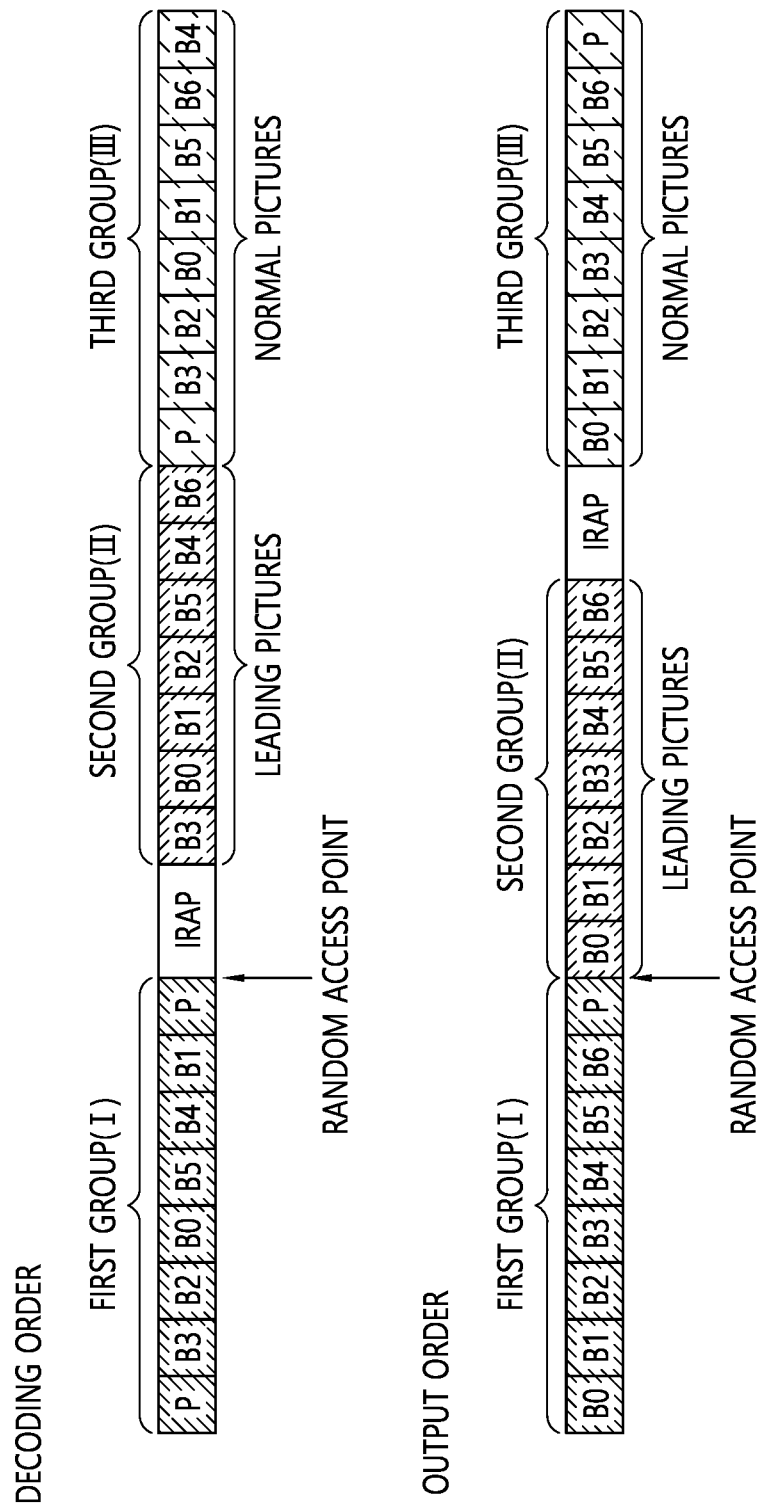
FIG. 12 is a diagram for describing a picture to which random access is possible.

FIG. 12 is a diagram for describing a picture to which random access is possible.

A picture to which random access is possible, i.e., a RAP or IRAP picture serving as a random access point, is the first picture in the decoding order in the bitstream during random access, and includes only I slices.

FIG. 12 shows an output order (or display order) and decoding order of pictures. As illustrated, an output order and a decoding order of pictures may be different from each other. For convenience, pictures are described while being divided into predetermined groups.

Pictures belonging to the first group (I) indicate pictures that precedes the IRAP picture in both output order and decoding order, and pictures belonging to the second group (II) indicate pictures that precede the IRAP picture in output order but follow it in decoding order. Pictures of the third group (III) follow the IRAP picture in both output order and decoding order.

The pictures of the first group (I) may be decoded and output regardless of the IRAP picture.

Pictures belonging to the second group (II) that are output before the IRAP picture are referred to as leading pictures, and the leading pictures may become problems in the decoding process when the IRAP picture is used as a random access point.

A picture belonging to the third group (III) which follows the IRAP picture in output order and decoding order is referred to as a normal picture. The normal picture is not used as a reference picture of the leading picture.

A random access point at which random access occurs in the bitstream becomes an IRAP picture, and as the first picture of the second group (II) is output, random access starts.

Figure 13:
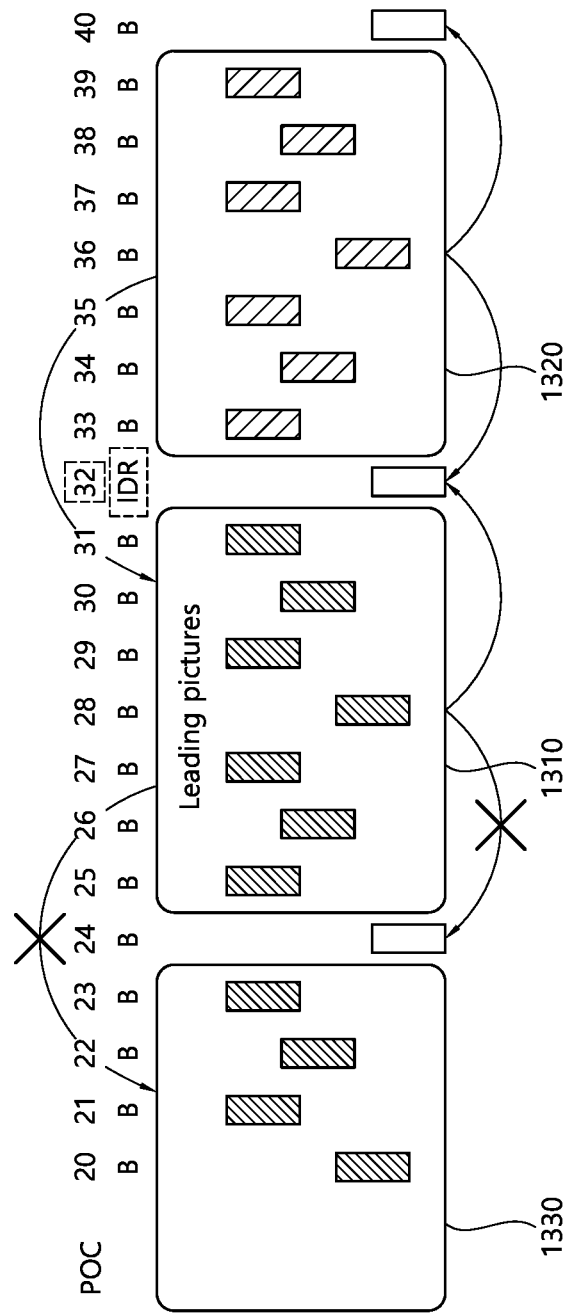
FIG. 13 is a diagram for describing an IDR picture.

FIG. 13 is a diagram for describing an IDR picture.

An IDR picture is a picture that becomes a random access point when a group of pictures has a closed structure. As described above, since the IDR picture is the IRAP picture, it includes only I slices, and may be the first picture in decoding order in the bitstream or may come in the middle of the bitstream. When the IDR picture is decoded, all reference pictures stored in a decoded picture buffer (DPB) are marked as "unused for reference".

A bar shown in FIG. 13 indicates a picture, and an arrow indicates a reference relationship with respect to whether a picture can use another picture as a reference picture. An x mark on the arrow indicates that the picture(s) cannot reference the picture indicated by the arrow.

As shown, a picture whose POC is 32 is an IDR picture. The POC is 25 to 31, and the pictures output before the IDR picture are the leading pictures 1310. The picture whose POC is 33 or more corresponds to the normal picture 1320.

Leading pictures 1310 that precede the IDR picture in output order may use a leading picture different from the IDR picture as a reference picture, but may not use the past picture 1330 that precedes the leading pictures 1310 in output order and decoding order as a reference picture.

Normal pictures 1320 that follow the IDR picture in output order and decoding order may be decoded with reference to the IDR picture, the leading picture, and other normal pictures.

Figure 14:
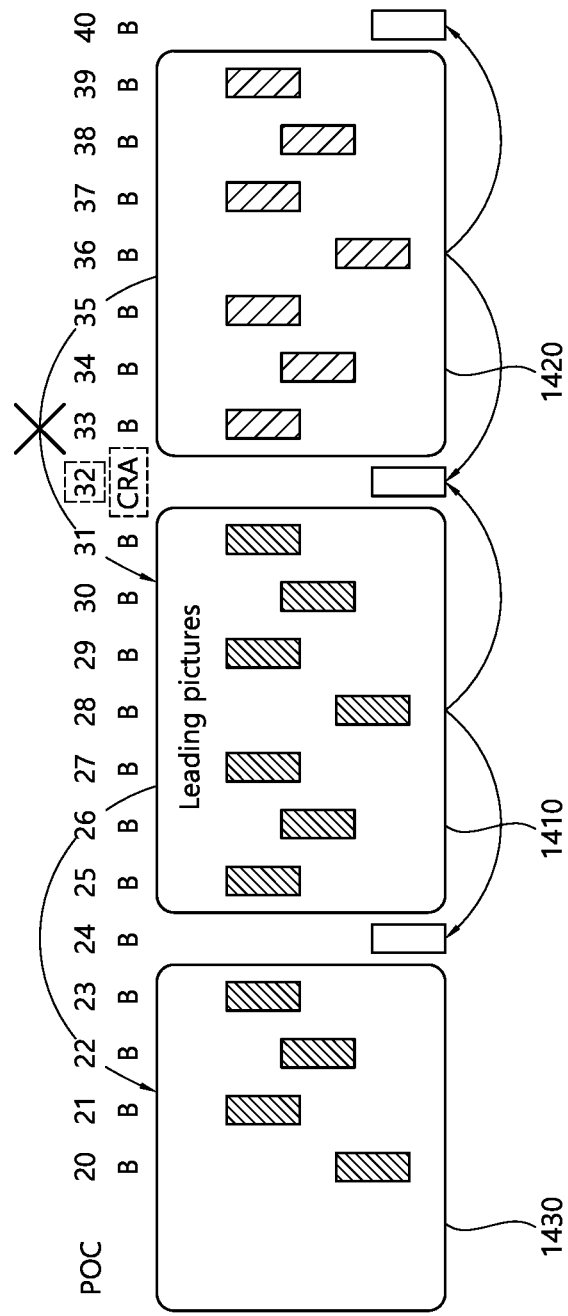
FIG. 14 is a diagram for describing a CRA picture.

FIG. 14 is a diagram for describing a CRA picture.

The CRA picture is a picture that becomes a random access point when a group of pictures has an open structure. As described above, since the CRA picture is also an IRAP picture, it includes only I slices, and may be the first picture in decoding order in the bitstream, or may come in the middle of the bitstream for normal play.

A bar shown in FIG. 14 indicates a picture, and an arrow indicates a reference relationship with respect to whether a picture can use another picture as a reference picture. An x mark on the arrow indicates that the picture or pictures cannot reference the picture indicated by the arrow.

The leading pictures 1410 that precede the CRA picture in output order may use all of the CRA picture, other leading pictures, and past pictures 1430 that precede the leading pictures 1410 in output order and decoding order as reference pictures.

Contrarily, normal pictures 1420 that follow the CRA picture in output order and decoding order may be decoded with reference to a normal picture different from the CRA picture. The normal pictures 1420 may not use the leading pictures 1410 as reference pictures.

Meanwhile, in the VVC standard, a picture being coded (i.e., a current picture) may be allowed to include slices of different NAL unit types. Whether the current picture includes slices of different NAL unit types may be indicated based on the syntax element pps_mixed_nalu_types_in_pic_flag. For example, when the current picture includes slices of different NAL unit types, the value of the syntax element pps_mixed_nalu_types_in_pic_flag may be expressed as 1. In this case, the current picture must reference the PPS including pps_mixed_nalu_types_in_pic_flag having a value of 1. The semantics of the flag (pps_mixed_nalu_types_in_pic_flag) are as follows:

When the value of the syntax element pps_mixed_nalu_types_in_pic_flag is 1, it may be indicated that each picture referencing the PPS has one or more VCL NAL units, that the VCL NAL units do not have the NAL unit type (nal_unit_ type) of the same value, and that the picture is not an IRAP picture.

When the value of the syntax element pps_mixed_nalu_types_in_pic_flag is 0, it may be indicated that each picture referencing the PPS has one or more VCL NAL units, and that the VCL NAL unit of each picture referencing the PPS has a NAL unit type (nal_unit_type) of the same value.

As described above, slices in a picture may have different NAL unit types. For example, when the value of pps_mixed_nalu_types_in_pic_flag is 1, the following may be applied.

A picture must include at least two subpictures.
VCL NAL units of a picture must have two or more different NAL unit type (nal_unit_type) values.
There must be no VCL NAL unit of a picture having the same NAL unit type (nal_unit_type) as GDR_NUT.
When the VCL NAL unit of at least one subpicture in the picture has a specific value of a NAL unit type (nal_unit_type) such as IDR_W_RADL, IDR_N_LP or CRA_NUT, all VCL NAL units of other subpictures within a picture must have the same NAL unit type (nal_unit_type) as TRAIL_NUT.

Also, if the picture includes mixed slices of RASL_NUT and RADL_NUT, the picture may be considered as a RASL picture, and may be processed as described below for derivation of the PictureOutputFlag.

Here, PictureOutputFlag may be flag information related to output of a picture. For example, if the PictureOutputFlag of the currently decoded picture is 1, it is marked as "needed for output", and if the PictureOutputFlag of the currently decoded picture is 0, it is marked as "not needed for output". A RASL (Random Access Skipped Leading) picture includes at least one VCL NAL unit having a NAL unit type (nal_unit_type) of RASL_NUT, and all other VCL NAL units refer to coded pictures having a NAL unit type (nal_unit_type) of RASL_NUT or RADL_NUT.

For example, the PictureOutputFlag of the current picture may be derived as follows.

If sps_video_parameter_set_id is greater than 0 and the current layer is not an output layer (i.e., nuh_layer_id is not equal to OutputLayerIdInOls[TargetOlsIdx][i], for i values in the range from 0 to NumOutputLayersInOls[TargetOlsIdx]−1), or if one of the following conditions is true, PictureOutputFlag is set to 0.

If the current picture is a RASL picture and the NoOutputBeforeRecoveryFlag of the associated IRAP picture is 1

If the current picture is a GDR picture in which NoOutputBeforeRecoveryFlag is 1, or a recovery picture of a GDR picture in which NoOutputBeforeRecoveryFlag is 1

Otherwise, PictureOutputFlag may be set equal to ph_pic_output_flag.

For reference, in terms of implementation, the decoder may output a picture that does not belong to the output layer. For example, if there is only one output layer while the picture of the output layer within the AU is not available (e.g., due to loss or layer down-switching), the decoder may set the PictureOutputFlag to 1 for the picture that has the highest nuh_layer_id value among all pictures of the AU available in the decoder and has ph_pic_output_flag equal to 1, and set the PictureOutputFlag to 0 for all other pictures of the AU available in the decoder.

Meanwhile, the VVC standard supports a gradual decoding refresh (GDR) function, by which decoding can start from a picture in which all parts of the reconstructed picture are not correctly decoded, but the parts of the reconstructed picture which are correctly decoded increase gradually in a subsequence picture until the whole picture is correctly decoded. A picture from which the decoding process can be started with the GDR function is referred to as a GDR picture, and the first picture following the GDR picture in which the entire picture is correctly decoded is referred to as a recovery point picture (or recovery picture).

The above-described NoOutputBeforeRecoveryFlag may be information indicating whether decoded pictures of pictures from the GDR picture before the recovery point picture in POC order or in decoding order can be output. For example, it may be determined that (decoded) pictures between the GDR picture and the recovery point picture are not output, and in this case, the value of NoOutputBeforeRecoveryFlag may be set to 1. Additionally, it may be determined that the (decoded) GDR picture is not output, and in this case, the value of NoOutputBeforeRecoveryFlag may be set to 1. However, it may be determined that the (decoded) recovery point picture is output, and in this case, the value of NoOutputBeforeRecoveryFlag may be set to 0. That is, in the case of pictures having POCs from the POC of the GDR picture to POC before the recovery point POC, the value of NoOutputBeforeRecoveryFlag may be determined to be 1.

On the other hand, the current VVC standard has the following problems in relation to the above-described output of the picture.

1) Before decoding of the current picture (but after parsing the slice header of the first slice in the current picture), a process related to picture output is invoked. However, it is unclear whether the derivation/determination of the picture output flag for a picture is only invoked for the first slice of the picture.

2) In the current standard, the decoder derives the value of the picture output flag when receiving the first slice of the picture. When the decoder receives the first slice of a picture in which the value of pps_mixed_nalu_types_in_pic_flag becomes 1, and when the NAL unit type of the slice is RASL_NUT or RADL_NUT, the decoder cannot determine whether the picture is a RASL picture. Because the remaining slices of the picture may become TRAIL_NUT, the picture may become a non-leading picture.

In other words, when a picture includes a mixed NAL unit type in which one of the NAL unit types is RASL_NUT, it is difficult to determine the value of the picture output flag (e.g., PictureOutputFlag) after receiving only the first slice of the picture. Accordingly, constraints are required for the process of determining the value of the picture output flag (e.g., PictureOutputFlag) to operate correctly. That is, this document proposes a method of setting the value of a picture output flag (e.g., PictureOutputFlag) that specifies whether a picture should be output when the picture includes different NAL unit types, in particular, when the leading picture (i.e., RASL_NUT and/or RADL_NUT) includes a mixed NAL unit type.

For example, this document proposes the following embodiments in order to solve the above-described problems, and the following embodiments may be applied individually or through one or more combinations.

1. The derivation of the value of the picture output flag (e.g., PictureOutputFlag) may be applied only one time per picture. That is, the value of the picture output flag (e.g., PictureOutputFlag) may be derived only for the first slice of the picture.
   a) A process related to picture output may be invoked during parsing of the slice header of the first slice in the picture.
2. When the picture includes a case where NAL unit type(s) other than RADL_NUT is mixed with RASL_NUT, or a case where RADL_NUT is mixed with NAL unit type(s) other than RASL_NUT, the following may be applied.
   a) When interlace coding is not used (i.e., when sps_field_seq_flag is 0), there must be at least one non-leading picture between a picture and an associated IRAP picture.
   b) Otherwise, when interlace coding is used (i.e., when sps_field_seq_flag is 1), there must be at least two non-leading pictures between the picture and the related IRAP picture.
3. If interlace is not used, if the decoder receives the first slice of the picture and determines that the value of pps_mixed_nalu_types_in_pic_flag is equal to 1, and if, at this time, the NAL unit type of the slice is RASL_NUT or RADL_NUT, and there is no non-leading picture received by the decoder from the last IRAP picture, then the decoder may determine that the picture including the first slice is a RASL picture.
4. If interlace is used, if the decoder receives the first slice of the picture and determines that the value of pps_mixed_nalu_types_in_pic_flag is equal to 1, and if, at this time, the NAL unit type of the slice is RASL_NUT or RADL_NUT, and there is exactly one non-leading picture received by the decoder from the last IRAP picture, then the decoder may determine that the picture including the first slice is a RASL picture.

The above-described embodiments of this document may be implemented in the form disclosed in Table 3 below. Table 3 shows an example providing the implementation of the above-described embodiments in relation to the output of a picture in the VVC specification.

TABLE 3

. . .

The value of nal_unit_type shall be the same for all VCL NAL units of a subpicture.

A subpicture is referred to as having the same NAL unit type as the VCL NAL units of the subpicture.

When any two subpictures in a picture have different NAL unit types, the value of sps_subpic_treated_as_pic_flag[ ] shall be equal to 1 for all subpictures in the picture that contain at least one P or B slice.

For VCL NAL units of any particular picture, the following applies:

- If pps_mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU.

TABLE 3-continued

- Otherwise (pps_mixed_nalu_types_in_pic_flag is equal to 1), the following applies:
  - The picture shall have at least two subpictures.
  - VCL NAL units of the picture shall have two or more different nal_unit_type values.
  - There shall be no VCL NAL unit of the picture that has nal_unit_type equal to GDR_NUT.
  - When the VCL NAL units of at least one subpicture of the picture have a particular value of nal_unit_type equal to IDR_W_RADL, IDR_N_LP, or CRA_NUT, the VCL NAL units of other subpictures in the picture shall all have nal_unit_type equal to TRAIL_NUT.

When vps_max_tid_il_ref_pics_plus1[ i ][ j ] is equal to 0 for j equal to GeneralLayerIdx[ nuh_layer_id ] and any value of i in the range of j + 1 to vps_max_layers_minus1, inclusive, the current picture shall not have both VCL NAL units with a particular value of nal_unit_type equal to IDR_W_RADL, IDR_N_LP, or CRA_NUT and VCL NAL units with nal_unit_type equal to a different value than that particular value.

It is a requirement of bitstream conformance that the following constraints apply:
- When a picture is a leading picture of an IRAP picture, it shall be a RADL or RASL picture.
- When a subpicture is a leading subpicture of an IRAP subpicture, it shall be a RADL or RASL subpicture.
- When a picture is not a leading picture of an IRAP picture, it shall not be a RADL or RASL picture.
- When a subpicture is not a leading subpicture of an IRAP subpicture, it shall not be a RADL or RASL subpicture.
- No RASL pictures shall be present in the bitstream that are associated with an IDR picture.
- No RASL subpictures shall be present in the bitstream that are associated with an IDR subpicture.
- No RADL pictures shall be present in the bitstream that are associated with an IDR picture having nal_unit_type equal to IDR_N_LP.
    NOTE 6 - It is possible to perform random access at the position of an IRAP PU by discarding all PUs before the IRAP PU (and to correctly decode the IRAP picture and all the subsequent non-RASL pictures in decoding order), provided each parameter set is available (either in the bitstream or by external means not specified in this Specification) when it is referenced.
- No RADL subpictures shall be present in the bitstream that are associated with an IDR subpicture having nal_unit_type equal to IDR_N_LP.
- Any picture, with nuh_layer_id equal to a particular value layerId, that precedes an IRAP picture with nuh_layer_id equal to layerId in decoding order shall precede the IRAP picture in output order and shall precede any RADL picture associated with the IRAP picture in output order.
- Any subpicture, with nuh_layer_id equal to a particular value layerId and subpicture index equal to a particular value subpicIdx, that precedes, in decoding order, an IRAP subpicture with nuh_layer_id equal to layerId and subpicture index equal to subpicIdx shall precede, in output order, the IRAP subpicture and all its associated RADL subpictures.
- Any picture, with nuh_layer_id equal to a particular value layerId, that precedes a recovery point picture with nuh_layer_id equal to layerId in decoding order shall precede the recovery point picture in output order.
- Any subpicture, with nuh_layer_id equal to a particular value layerId and subpicture index equal to a particular value subpicIdx, that precedes, in decoding order, a subpicture with nuh_layer_id equal to layerId and subpicture index equal to subpicIdx in a recovery point picture shall precede that subpicture in the recovery point picture in output order.
- Any RASL picture associated with a CRA picture shall precede any RADL picture associated with the CRA picture in output order.
- Any RASL subpicture associated with a CRA subpicture shall precede any RADL subpicture associated with the CRA subpicture in output order.
- Any RASL picture, with nuh_layer_id equal to a particular value layerId, associated with a CRA picture shall follow, in output order, any IRAP or GDR picture with nuh_layer_id equal to layerId that precedes the CRA picture in decoding order.
- Any RASL subpicture, with nuh_layer_id equal to a particular value layerId and subpicture index equal to a particular value subpicIdx, associated with a CRA subpicture shall follow, in output order, any IRAP or GDR subpicture, with nuh_layer_id equal to layerId and subpicture index equal to subpicIdx, that precedes the CRA subpicture in decoding order.
- If sps_field_seq_flag is equal to 0 and the current picture, with nuh_layer_id equal to a particular value layerId, is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture with nuh_layer_id equal to layerId preceding picA in decoding order, and there shall be no non-leading picture with nuh_layer_id equal to layerId between picA and picB in decoding order.
- If sps_field_seq_flag is equal to 0 and the current subpicture, with nuh_layer_id equal to a particular value layerId and subpicture index equal to a particular value subpicIdx, is a leading subpicture associated with an IRAP subpicture, it shall

TABLE 3-continued precede, in decoding order, all non-leading subpictures that are associated with
the same IRAP subpicture. Otherwise, let subpicA and subpicB be the first and
the last leading subpictures, in decoding order, associated with an IRAP
subpicture, respectively, there shall be at most one non-leading subpicture with
nuh_layer_id equal to layerId and subpicture index equal to subpicIdx preceding
subpicA in decoding order, and there shall be no non-leading picture with
nuh_layer_id equal to layerId and subpicture index equal to subpicIdx between
picA and picB in decoding order.
- When current picture, with nuh_layer_id equal to a particular value layerId, is a
picture with pps_mixed_nalu_types_in_pic_flag equal to 1 containing at least one
slice with NAL unit type other than RASL_NUT or RADL_NUT, the following
applies:
  - If sps_field_seq_flag is equal to 0, there shall be at least one picture that is
  not a leading picture (i.e., not a RASL picture nor a RADL picture) that
  precede the current picture and follow the associated IRAP picture, in
  decoding order.
  - Otherwise, there shall be at least two pictures that are not a leading picture
  (i.e., not a RASL picture nor a RADL picture) that precede the current
  picture and follow the associated IRAP picture, in decoding order.
. . .
  - The variable PictureOutputFlag of the current picture is derived as
  follows. This needs to be invoked only for the first slice of a picture:
    - If sps_video_parameter_set_id is greater than 0 and the current layer
    is not an output layer (i.e., nuh_layer_id is not equal to
    OutputLayerIdInOls[ TargetOlsIdx ][ i ] for any value of i in the
    range of 0 to NumOutputLayersInOls[ TargetOlsIdx ] − 1,
    inclusive), or one of the following conditions is true,
    PictureOutputFlag is set equal to 0:
      - The current picture is a RASL picture and
      NoOutputBeforeRecoveryFlag of the associated IRAP picture is
      equal to 1.
      NOTE - In an implementation, the decoder could determine that
      the current picture with pps_mixed_nalu_types_in_pic_flag
      equal to 1 is RASL picture if one of the following is satisfied
        - sps_field_seq_flag is equal to 0, NAL unit type of the first
        slice of the picture is RASL_NUT or RADL_NUT, and there
        is no non-leading picture since the last IRAP picture.
        - sps_field_seq_flag is equal to 1, NAL unit type of the first
        slice of the picture is RASL_NUT or RADL_NUT, and there
        is exactly one non-leading picture since the last IRAP picture.
      - The current picture is a GDR picture with
      NoOutputBeforeRecoveryFlag equal to 1 or is a recovering
      picture of a GDR picture with NoOutputBeforeRecoveryFlag
      equal to 1.
    - Otherwise, PictureOutputFlag is set equal to ph_pic_output_flag.
    NOTE - In an implementation, the decoder could output a
    picture not belonging to an output layer. For example, when there
    is only one output layer while in an AU the picture of the output
    layer is not available, e.g., due to a loss or layer down-switching,
    the decoder could set PictureOutputFlag set equal to 1 for the
    picture that has the highest value of nuh_layer_id among all
    pictures of the AU available to the decoder and having
    ph_pic_output_flag equal to 1, and set PictureOutputFlag equal
    to 0 for all other pictures of the AU available to the decoder.
. . .

Figure 15:
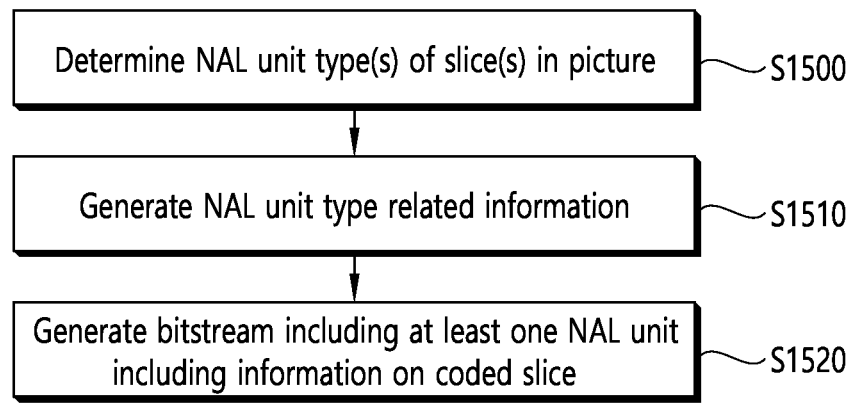
FIG. 15 schematically represents an example of a video/image encoding method to which the above-described embodiment or embodiments of this document can be applied.

FIG. 15 schematically represents an example of a video/image encoding method to which the above-described embodiment or embodiments of this document can be applied. The method disclosed in FIG. 15 may be performed by the encoding apparatus 200 disclosed in FIG. 2. Also, one or more of the steps of FIG. 15 may be omitted, and other step may be added according to an embodiment.

Referring to FIG. 15, the encoding apparatus may determine NAL unit type(s) for slice(s) in a picture (S1500), and generate NAL unit type related information (S1510).

Here, the NAL unit type related information may include information/syntax elements related to the NAL unit type disclosed in Table 1 or Table 2 above. For example, the NAL unit type related information may include a mixed_nalu_types_in_pic_flag syntax element of PPS and/or a nal_unit_type syntax element of a NAL unit header of a NAL unit including information on a coded slice.

When the value of mixed_nalu_types_in_pic_flag is 0, slices in the picture associated with the PPS use the same NAL unit type. That is, when the value of mixed_nalu_types_in_pic_flag is 0, the NAL unit type defined in the first NAL unit header of the first NAL unit including information on the first slice of the picture is the same as the NAL unit type defined in the second NAL unit header of the second NAL unit including information on the second slice in the same picture.

When the value of mixed_nalu_types_in_pic_flag is 1, slices in a picture associated with the PPS may use other NAL unit types according to the above-described embodiments of this document. For example, when the value of mixed_nalu_types_in_pic_flag is 1, slices in a picture (related to PPS) may use different NAL unit types, but slices in the same subpicture may use the same NAL unit type.

For example, a picture may include subpicture A and subpicture B. In this case, slices in subpicture A use the same NAL unit type (NAL unit type A), and slices in subpicture B use the same NAL unit type (NAL unit type B), but when the value of mixed_nalu_types_in_pic_flag is 1, NAL unit type A is not the same as NAL unit type B. The NAL unit type for a slice (i.e., for a NAL unit including information on the slice) may be one of indices 0 to 10 disclosed in Table 1 or Table 2 above.

The encoding apparatus may generate a bitstream including at least one NAL unit including information on a coded slice (S1520).

Here, the bitstream may include a NAL unit including information on a coded slice. The bitstream may include a PPS.

Figure 16:
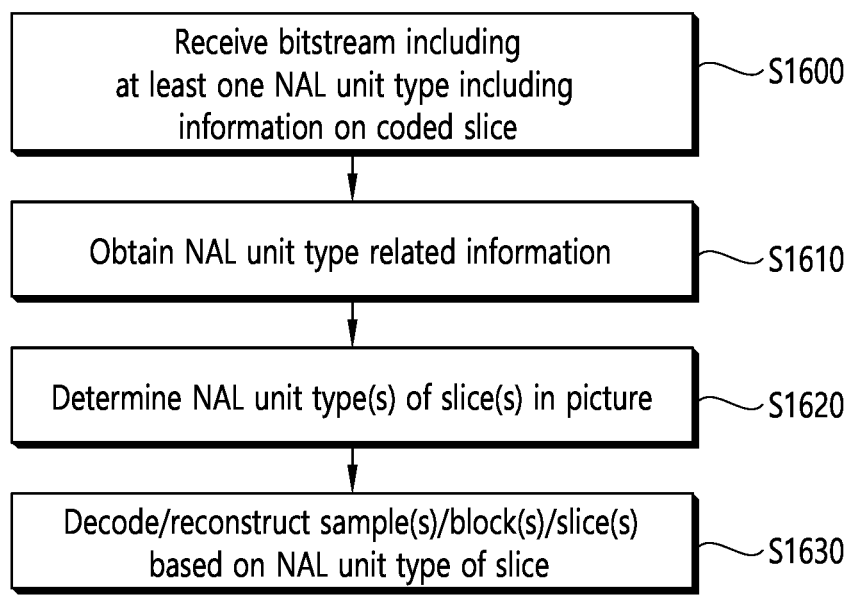
FIG. 16 schematically represents an example of a video/image decoding method to which the above-described embodiment or embodiments of this document can be applied.

FIG. 16 schematically represents an example of a video/image decoding method to which the above-described embodiment or embodiments of this document can be applied. The method disclosed in FIG. 16 may be performed by the decoding apparatus 300 disclosed in FIG. 3. Also, one or more of the steps of FIG. 16 may be omitted, and other step may be added according to an embodiment.

Referring to FIG. 16, the decoding apparatus may receive a bitstream including at least one NAL unit including information on a coded slice (S1600), and may obtain NAL unit type related information (S1610).

As described above, the NAL unit type related information may include information/syntax elements related to the NAL unit type disclosed in Table 1 or Table 2 above. For example, the NAL unit type related information may include a mixed_nalu_types_in_pic_flag syntax element of PPS and/or a nal_unit_type syntax element of a NAL unit header of a NAL unit including information on a coded slice.

The decoding apparatus may determine the NAL unit type(s) for the slice(s) in the picture based on the NAL unit type related information (S1620).

For example, as described above, NAL unit types for slices in a picture may be determined based on the value of mixed_nalu_types_in_pic_flag. In this regard, the NAL unit type for a slice (i.e., for a NAL unit including information on the slice) may be determined as one of indices 0 to 10 disclosed in Table 1 or Table 2 above. Since a specific example related thereto has been described in detail in the embodiment of FIG. 15, it will be omitted in the present embodiment.

The decoding apparatus may decode/reconstruct the sample(s)/block(s)/slice(s) in a picture based on the NAL unit type of the slice (S1630).

For example, sample(s)/block(s) in a slice may be decoded/reconstructed based on the NAL unit type of that slice. When the first NAL unit type is set for the first slice in the current picture and the second NAL unit type (different from the first NAL unit type) is set for the second slice in the current picture, the sample(s)/block(s) in the first slice or the first slice itself may be decoded/reconstructed based on the first NAL unit type, and the sample(s)/block(s) in the second slice or the second slice itself may be decoded/reconstructed based on the second NAL unit type.

Also, for example, the first slice may be in the first subpicture, and the second slice may be in the second subpicture. In this case, when the third slice is located in the first subpicture, the NAL unit type for the third slice may be the same as the first NAL unit type. In this case, when the fourth slice is located in the second subpicture, the NAL unit type for the fourth slice may be the same as the second NAL unit type. When the fifth slice is located in the third subpicture, the NAL unit type for the fifth slice may be different from the first NAL unit type and the second NAL unit type.

Meanwhile, as described above, in the current VVC standard, there is a problem in deriving a flag related to picture output (e.g., PictureOutputFlag). That is, the derivation of a flag related to picture output (e.g., PictureOutputFlag) is invoked for all pictures. However, there is a problem in that it is not clear when the derivation process is invoked. According to the current VVC standard, it seems to be invoked at the beginning of decoding of a picture. However, the flag related to picture output (e.g., PictureOutputFlag) itself is used or needed at the end of decoding of a picture, i.e., during an additional bumping process.

Accordingly, in this document, the following embodiments are proposed in order to provide a solution to the above-described problem. The following embodiments may be applied individually, or may be applied in combination with the embodiments presented in the implementation method of Table 3 above.

As an embodiment, the process of deriving a picture output flag (e.g., PictureOutputFlag) may be changed to be invoked when decoding of the current picture is ended. That is, the process of deriving a picture output flag (e.g., PictureOutputFlag) may be invoked after all slices in the picture are decoded.

The above-described embodiment of this document may be implemented in a form as shown in Table 4 below. Table 4 shows an example providing the implementation of the above-described embodiment in relation to the output of a picture in the VVC specification.

TABLE 4

...
The decoding process operates as follows for the current picture CurrPic:
  1.  The decoding of NAL units is specified in clause 8.2.
  2.  The processes in clause 8.3 specify the following decoding processes using
      syntax elements in the slice header layer and above:
       -  Variables and functions relating to picture order count are derived
          as specified in clause 8.3.1. This needs to be invoked only for
          the first slice of a picture.
       -  At the beginning of the decoding process for each slice of a picture,
          the decoding process for reference picture lists construction
          specified in clause 8.3.2 is invoked for derivation of reference
          picture list 0 (RefPicList[ 0 ]) and reference picture list 1
          (RefPicList[ 1 ]).
       -  The decoding process for reference picture marking in clause 8.3.3
          is invoked, wherein reference pictures may be marked as "unused
          for reference" or "used for long-term reference". This needs
          to be invoked only for the first slice of a picture.
       -  When the current picture is a CRA picture with
          NoOutputBeforeRecoveryFlag equal to 1 or GDR picture with
          NoOutputBeforeRecoveryFlag equal to 1, the decoding process for generating
          unavailable reference pictures specified in subclause 8.3.4 is TABLE 4-continued invoked, which needs to be invoked only for the first slice of a picture.
3. The processes in clauses 0, 8.5, 8.6, 8.7, and 8.8 specify decoding processes using syntax elements in all syntax structure layers. It is a requirement of bitstream conformance that the coded slices of the picture shall contain slice data for every CTU of the picture, such that the division of the picture into slices, and the division of the slices into CTUs each forms a partitioning of the picture.
4. After all slices of the current picture have been decoded, the following applies:
   - The current decoded picture is marked as "used for short-term reference".
   - Each ILRP entry, when present, in RefPicList[ 0 ] or RefPicList[ 1 ] is marked as "used for short-term reference".
   - The variable PictureOutputFlag of the current picture is derived as follows:
     - If sps_video_parameter_set_id is greater than 0 and the current layer is not an output layer (i.e., nuh_layer_id is not equal to OutputLayerIdInOls[ TargetOlsIdx ][ i ] for any value of i in the range of 0 to NumOutputLayersInOls[ TargetOlsIdx ] − 1, inclusive), or one of the following conditions is true, PictureOutputFlag is set equal to 0:
       - The current picture is a RASL picture and NoOutputBeforeRecoveryFlag of the associated IRAP picture is equal to 1.
       - The current picture is a GDR picture with NoOutputBeforeRecoveryFlag equal to 1 or is a recovering picture of a GDR picture with NoOutputBeforeRecoveryFlag equal to 1.
     - Otherwise, PictureOutputFlag is set equal to ph_pic_output_flag.
       NOTE - In an implementation, the decoder could output a picture not belonging to an output layer. For example, when there is only one output layer while in an AU the picture of the output layer is not available, e.g., due to a loss or layer down-switching, the decoder could set PictureOutputFlag set equal to 1 for the picture that has the highest value of nuh_layer_id among all pictures of the AU available to the decoder and having ph_pic_output_flag equal to 1, and set PictureOutputFlag equal to 0 for all other pictures of the AU available to the decoder.

. . .

Referring to Table 4, the decoding process for the current picture may be operated as follows.

First, the NAL unit may be decoded, and the slice may be decoded using syntax elements included in the slice header layer and the higher layer. In performing slice decoding, POC-related information (variables and functions) may be derived, and decoding for constructing a reference picture list may be performed at the beginning of decoding for each slice in a picture. In addition, a decoding process for reference picture marking may be performed, in which case the reference picture may be marked as "unused for reference" or "used for long-term reference". Also, a decoding process of generating an unavailable reference picture may be performed.

Next, a decoding process (i.e., the above-described inter prediction or intra prediction, residual processing procedure, in-loop filtering, etc.) may be performed based on the syntax elements included in all syntax. At this time, it is a requirement of the bitstream conformance that the coded slice of the picture includes slice data for every CTUs of the picture, such that the division of the picture into slices, and the division of the slices into CTUs forms a partitioning of the picture, respectively.

Next, after all slices in the current picture have been decoded, a picture output related flag (PictureOutputFlag) may be derived. For example, the currently decoded picture is marked as "used for short-term reference", each ILRP entry in the reference picture list (RefPicList[0] or RefPicList[1]) may be marked as "used for short-term reference".

And, a picture output related flag (PictureOutputFlag) may be derived based on at least one of the following conditions.

Based on the first condition that a value of a syntax element related to video parameter set (VPS) ID is greater than 0 and a current layer is not an output layer, the value of the picture output flag (PictureOutputFlag) is derived as 0. Here, the syntax element related to the VPS ID may be an sps_video_parameter_set_id syntax element, and may be signaled from the above-described sequence parameter set (SPS). For example, when the value of sps_video_parameter_set_id is greater than 0, the value of sps_video_parameter_set_id may represent the value of a VPS ID (e.g., vps_video_parameter_set_id) that is identification information for a video parameter set (VPS). The existence of the VPS may be an option in the case of a bitstream that is a single layer.

Based on the second condition that the current picture is a random access skipped leading (RASL) picture and NoOutputBeforeRecoveryFlag of an associated intra random access point (IRAP) picture is 1, the value of the picture output flag (PictureOutputFlag) may be derived as 0. In this connection, the NoOutputBeforeRecoveryFlag may be flag information indicating whether decoded pictures of pictures from a gradual decoding refresh (GDR) picture before a recovery point picture in picture order count (POC) order or in decoding order can be output. For example, it may be determined that (decoded) pictures between the GDR picture and the recovery point picture are not output, and in this case, the value of NoOutputBeforeRecoveryFlag may be set to 1. Additionally, it may be determined that the (decoded) GDR picture is not output, and in this case, the value of NoOutputBeforeRecoveryFlag may be set to 1. However, it may be determined that the (decoded) recovery point picture is output, and in this case, the value of NoOutputBeforeRecoveryFlag may be set to 0. That is, in the case of pictures having POCs from the POC of the GDR picture to POC before the recovery point POC, the value of NoOutputBeforeRecoveryFlag may be determined to be 1.

Based on the third condition that the current picture is a gradual decoding refresh (GDR) picture with NoOutputBeforeRecoveryFlag equal to 1, or a recovery picture of a GDR picture with NoOutputBeforeRecoveryFlag equal to 1, the value of the picture output flag (PictureOutputFlag) may be derived as 0.

Otherwise, when at least one of the first condition, the second condition, and the third condition is not satisfied, the value of the picture output flag (PictureOutputFlag) may be derived as the value of the picture output related syntax element to be signaled. In this case, the picture output related syntax element to be signaled may be ph_pic_output_flag, as shown in Table 4 above. The ph_pic_output_flag syntax element may be information affecting the output and removal process of the decoded picture, and, for example, if the value of ph_pic_output_flag is 1, it may indicate that the decoded picture is output, while, if the value of ph_pic_output_flag is 0, it may indicate that the decoded picture is not output.

Figure 17:
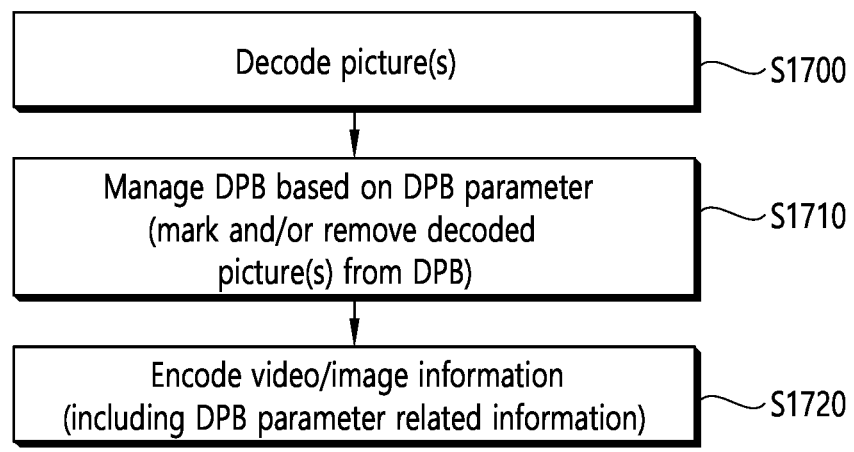
FIG. 17 schematically represents an example of a video/image encoding method to which the above-described embodiment or embodiments of this document can be applied.

FIG. 17 schematically represents an example of a video/image encoding method to which the above-described embodiment or embodiments of this document can be applied. The method disclosed in FIG. 17 may be performed by the encoding apparatus 200 disclosed in FIG. 2. Also, one or more of the steps of FIG. 17 may be omitted, and other step may be added according to an embodiment.

Referring to FIG. 17, the encoding apparatus may decode/reconstruct the picture(s) (S1700). The encoding apparatus may manage the DPB based on the DPB parameter (S1710). In other words, the encoding apparatus may mark and/or remove the picture(s) decoded from the DPB based on the DPB parameter.

The decoded pictures may be used as a reference for inter prediction of a sequence picture. Each decoded picture may be basically inserted (stored) in the DPB. And the DPB may generally be updated before decoding the current picture. When the layer associated with the DPB is not the output layer (or the DPB parameters are not associated with the output layer) but a reference layer, decoded pictures in the DPB may not be output. When the layer associated with the DPB (or DPB parameter) is the output layer, decoded pictures in the DPB may be output based on the DPB and/or the DPB parameter.

Managing the DPB may be referred to as updating the DPB. Managing the DPB may include outputting a decoded picture from the DPB. DPB parameter related information may include information/syntax element related to DPB management, and, for example, may include syntax elements included in the DPB parameter syntax disclosed in the VVC standard. DPB management may be performed based on the value of a picture output flag (e.g., PictureOutputFlag) derived in the process of deriving the picture output flag (e.g., PictureOutputFlag) of the above-described embodiment.

Other DPB parameter(s) may be signaled based on whether the current layer is an output layer or a reference layer, or other DPB parameter(s) may be signaled based on whether the DPB (or DPB parameter) is for OLS (mapped to OLS).

The encoding apparatus may encode video/image information (S1720). In an embodiment, the encoding apparatus may encode video/image information including DPB parameter related information. The DPB parameter related information may include the information/syntax element related to the DPB management as described above.

Although not shown in FIG. 17, the encoding apparatus may decode the current picture based on the DPB updated/managed after step S1710. In addition, the decoded current picture may be inserted into the DPB, and the DPB including the decoded current picture may be updated based on the DPB parameter before decoding the sequence picture.

Figure 18:
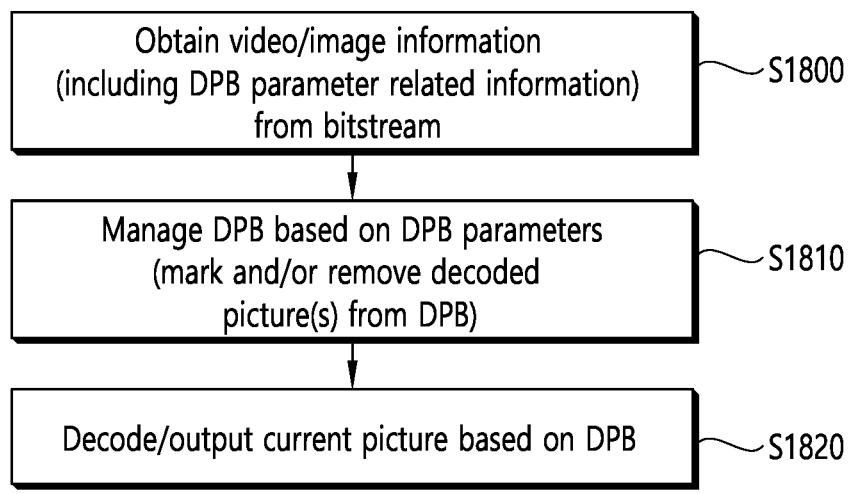
FIG. 18 schematically represents an example of a video/image decoding method to which the above-described embodiment or embodiments of this document can be applied.

FIG. 18 schematically represents an example of a video/image decoding method to which the above-described embodiment or embodiments of this document can be applied. The method disclosed in FIG. 18 may be performed by the decoding apparatus 300 disclosed in FIG. 3. Also, one or more of the steps of FIG. 18 may be omitted, and other step may be added according to an embodiment.

Referring to FIG. 18, the decoding apparatus may obtain video/image information from a bitstream (S1800). In an embodiment, the decoding apparatus may obtain video/image information including DPB parameter related information from a bitstream. The DPB parameter related information may include the information/syntax element related to the DPB management as described above.

The decoding apparatus may manage the DPB based on the DPB parameter (S1810). In other words, the decoding apparatus may mark and/or remove the picture(s) decoded from the DPB based on the DPB parameter.

The decoded pictures may be used as a reference for inter prediction of a sequence picture. Each decoded picture may be basically inserted (stored) in the DPB. And the DPB may generally be updated before decoding the current picture. When the layer associated with the DPB is not the output layer (or the DPB parameters are not associated with the output layer) but a reference layer, decoded pictures in the DPB may not be output. When the layer associated with the DPB (or DPB parameter) is the output layer, decoded pictures in the DPB may be output based on the DPB and/or the DPB parameter.

Managing the DPB may be referred to as updating the DPB. Managing the DPB may include outputting a decoded picture from the DPB. DPB parameter related information may include information/syntax element related to DPB management, and, for example, may include syntax elements included in the DPB parameter syntax disclosed in the VVC standard. DPB management may be performed based on the value of a picture output flag (e.g., PictureOutputFlag) derived in the process of deriving the picture output flag (e.g., PictureOutputFlag) of the above-described embodiment.

Other DPB parameter(s) may be signaled based on whether the current layer is an output layer or a reference layer, or other DPB parameter(s) may be signaled based on whether the DPB (or DPB parameter) is for OLS (mapped to OLS).

The decoding apparatus may decode/output the current picture based on the DPB (S1820). In an embodiment, the block/slice in the current picture may be decoded based on the inter prediction using the (previously) decoded picture in the DPB as a reference.

The following drawings were prepared to explain a specific example of the present document. Since the names or specific terms, or names of specific devices described in the drawings (e.g., names of syntax/syntax elements, etc.) are presented as examples, the technical features of the present document are not limited to the specific names used in the following drawings.

Figure 19:
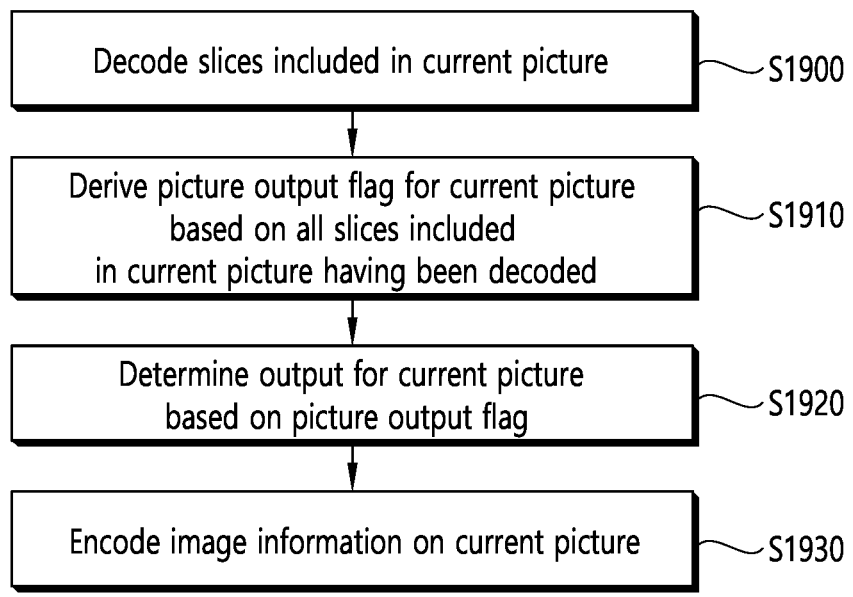
FIGS. 19 and 20 schematically illustrate a video/image encoding method and an example of related components according to embodiment(s) of the present document.
Figure 20:
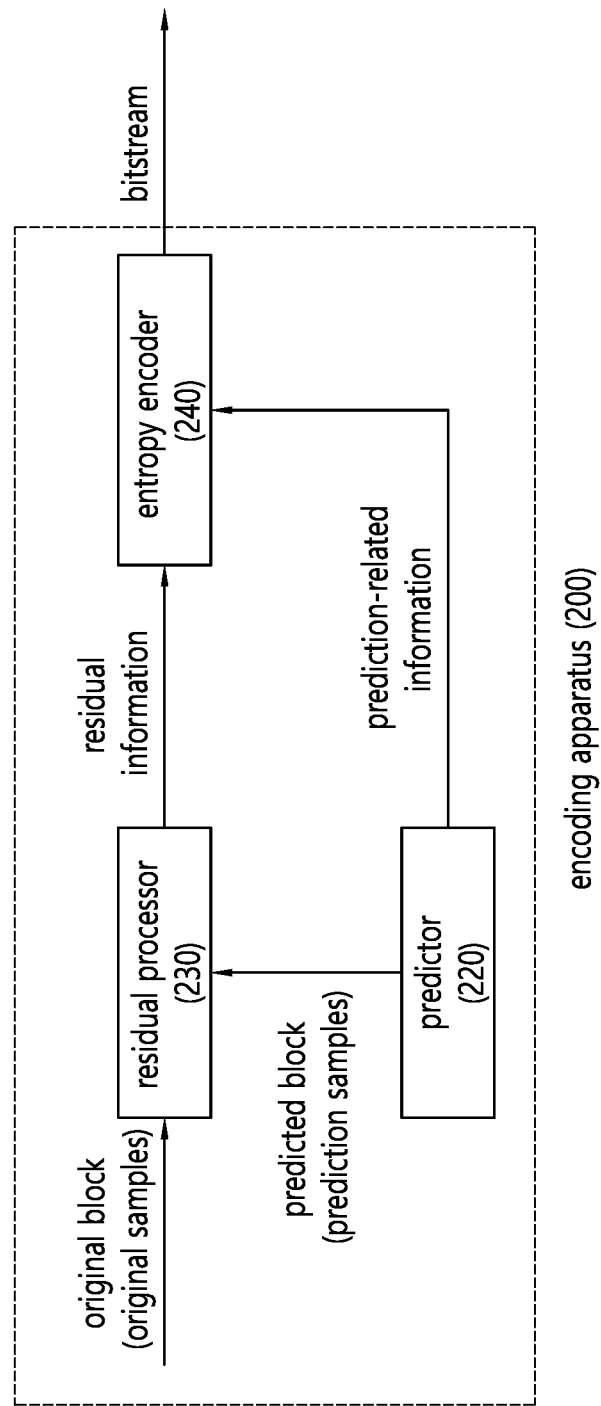

FIGS. 19 and 20 schematically represent an example of a video/image encoding method and associated components according to the embodiment(s) of this document.

The method disclosed in FIG. 19 may be performed by the encoding apparatus 200 disclosed in FIG. 2 or FIG. 20. Here, the encoding apparatus 200 disclosed in FIG. 20 is a simplified representation of the encoding apparatus 200 disclosed in FIG. 2. Specifically, step S1900 of FIG. 19 may be performed by the image partitioner 210, the predictor 220, the residual processor 230, the adder 340, and the like disclosed in FIG. 2; steps S1910 to S1920 may be performed by the DPB disclosed in FIG. 2; and S1930 may be performed by the entropy encoder 240 disclosed in FIG. 2. In addition, the method disclosed in FIG. 19 may be performed including the embodiments described above in this document. Accordingly, in FIG. 19, a detailed description of contents corresponding to the repetition of the above-described embodiments will be omitted or simplified.

Referring to FIG. 19, the encoding apparatus may decode slices included in the current picture (S1900).

In an embodiment, the encoding apparatus may decode (reconstruct) slices in the current picture through the above-described picture partition process, intra prediction or inter prediction, residual processing, in-loop filtering, and the like.

The decoded pictures may be used as a reference for inter prediction of a sequence picture. For this, each decoded picture may be basically inserted (stored) in the DPB. As described above, the DPB may generally be updated before decoding the current picture. When the layer associated with the DPB is not the output layer (or the DPB parameters are not associated with the output layer) but a reference layer, decoded pictures in the DPB may not be output. When the layer associated with the DPB (or DPB parameter) is the output layer, decoded pictures in the DPB may be output based on the DPB and/or the DPB parameter. At this time, it may be determined whether the decoded pictures stored in the DPB are output. Whether to output the picture may be determined by deriving the picture output flag.

The encoding apparatus may derive a picture output flag for the current picture based on all slices included in the current picture having been decoded (S1910). The encoding apparatus may determine the output for the current picture based on the picture output flag (S1920).

As described above, the picture output flag may have a value related to whether the current picture is output, and may be expressed as, for example, a PictureOutputFlag value. For example, based on a value of a picture output flag (e.g., PictureOutputFlag) being 0, the current picture may be marked as "not needed for output". Alternatively, based on the value of the picture output flag (e.g., PictureOutputFlag) being 1, the current picture may be marked as "needed for output". That is, if the value of the picture output flag (e.g., PictureOutputFlag) is 1, the current picture may be output from the DPB, while, if the value of the picture output flag (e.g., PictureOutputFlag) is 0, it may be stored or removed instead of being output from the DPB.

In an embodiment, the picture output flag (e.g., PictureOutputFlag) may be derived as a value of 0 or 1 based on at least one of the following conditions.

Based on the first condition that a value of a syntax element related to video parameter set (VPS) ID is greater than 0 and a current layer is not an output layer, the value of the picture output flag (e.g., PictureOutputFlag) is derived as 0. Here, the syntax element related to the VPS ID may be an sps_video_parameter_set_id syntax element, and may be signaled from the above-described sequence parameter set (SPS). For example, when the value of sps_video_parameter_set_id is greater than 0, the value of sps_video_parameter_set_id may represent the value of a VPS ID (e.g., vps_video_parameter_set_id) that is identification information for a video parameter set (VPS). The existence of the VPS may be an option in the case of a bitstream that is a single layer.

Based on the second condition that the current picture is a random access skipped leading (RASL) picture and NoOutputBeforeRecoveryFlag of an associated intra random access point (TRAP) picture is 1, the value of the picture output flag (e.g., PictureOutputFlag) may be derived as 0. In this connection, the NoOutputBeforeRecoveryFlag may be flag information indicating whether decoded pictures of pictures from a gradual decoding refresh (GDR) picture before a recovery point picture in picture order count (POC) order or in decoding order can be output. For example, it may be determined that (decoded) pictures between the GDR picture and the recovery point picture are not output, and in this case, the value of NoOutputBeforeRecoveryFlag may be set to 1. Additionally, it may be determined that the (decoded) GDR picture is not output, and in this case, the value of NoOutputBeforeRecoveryFlag may be set to 1. However, it may be determined that the (decoded) recovery point picture is output, and in this case, the value of NoOutputBeforeRecoveryFlag may be set to 0. That is, in the case of pictures having POCs from the POC of the GDR picture to POC before the recovery point POC, the value of NoOutputBeforeRecoveryFlag may be determined to be 1.

Based on the third condition that the current picture is a gradual decoding refresh (GDR) picture with NoOutputBeforeRecoveryFlag equal to 1, or a recovery picture of a GDR picture with NoOutputBeforeRecoveryFlag equal to 1, the value of the picture output flag (e.g., PictureOutputFlag) may be derived as 0.

Otherwise, when at least one of the first condition, the second condition, and the third condition is not satisfied, the value of the picture output flag (e.g., PictureOutputFlag) may be derived as the value of the picture output related syntax element to be signaled. In this case, the picture output related syntax element to be signaled may be ph_pic_output_flag, as shown in Table 4 above. The ph_pic_output_flag syntax element may be information affecting the output and removal process of the decoded picture, and, for example, if the value of ph_pic_output_flag is 1, it may indicate that the decoded picture is output, while, if the value of ph_pic_output_flag is 0, it may indicate that the decoded picture is not output.

The process of deriving the picture output flag (e.g., PictureOutputFlag) in the above-described embodiment is a process that is applied based on the conditions according to the specification algorithm disclosed in Table 4 above. In another embodiment, a value of a picture output flag (e.g., PictureOutputFlag) may be derived based on conditions according to the specification algorithm disclosed in Table 3 above.

Also, in an embodiment, with respect to a bitstream that is a single layer, the encoding apparatus may also derive a picture output flag (e.g., PictureOutputFlag) for the current picture based on all slices included in the current picture having been decoded. Also, in an embodiment, even in the case of a bitstream supporting a multi-layer, a picture output flag (e.g., PictureOutputFlag) may be derived after all slices in the current are decoded in the same way as in a single layer. In this way, when the picture output flag (e.g., PictureOutputFlag) is derived after all slices in each picture have been decoded, regardless of whether the bitstream is a single layer or a multi-layer, there is no need to unnecessarily perform the process of deriving the output related information (i.e., the picture output flag) regardless of whether the bitstream is a single layer or a multi-layer. In addition, there is no need to unnecessarily update the output related information (i.e., the picture output flag) regardless of whether the picture is the last picture in the access unit (AU).

When the value of the picture output flag (e.g., PictureOutputFlag) derived as described above is 1, the (decoded) current picture may be output according to the output order or the POC order. Alternatively, when the value of the output flag (e.g., PictureOutputFlag) is 0, the (decoded) current picture is not output.

The encoding apparatus may encode image information on the current picture (S1930).

In an embodiment, the encoding apparatus may generate various information/syntax elements derived in a process of decoding the slices in the current picture as image/video information, and may encode such various information. For example, the image/video information may include a slice header for slices in the current picture.

The image/video information including various informations as described above may be encoded and output in the form of a bitstream. The bitstream may be transmitted to the decoding apparatus through a network or a (digital) storage medium. Here, the network may include a broadcast network, a communication network and/or the like, and the digital storage medium may include various storage media, such as a universal serial bus (USB), secure digital (SD), a compact disk (CD), a digital video disk (DVD), Blu-ray, a hard disk drive (HDD), a solid state drive (SSD), and the like.

Figure 21:
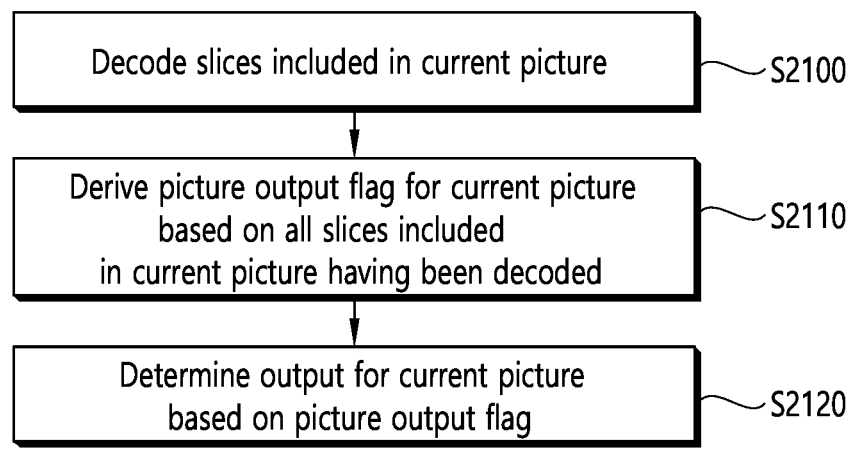
FIGS. 21 and 22 schematically illustrate a video/image decoding method and an example of related components according to embodiment(s) of the present document
Figure 22:
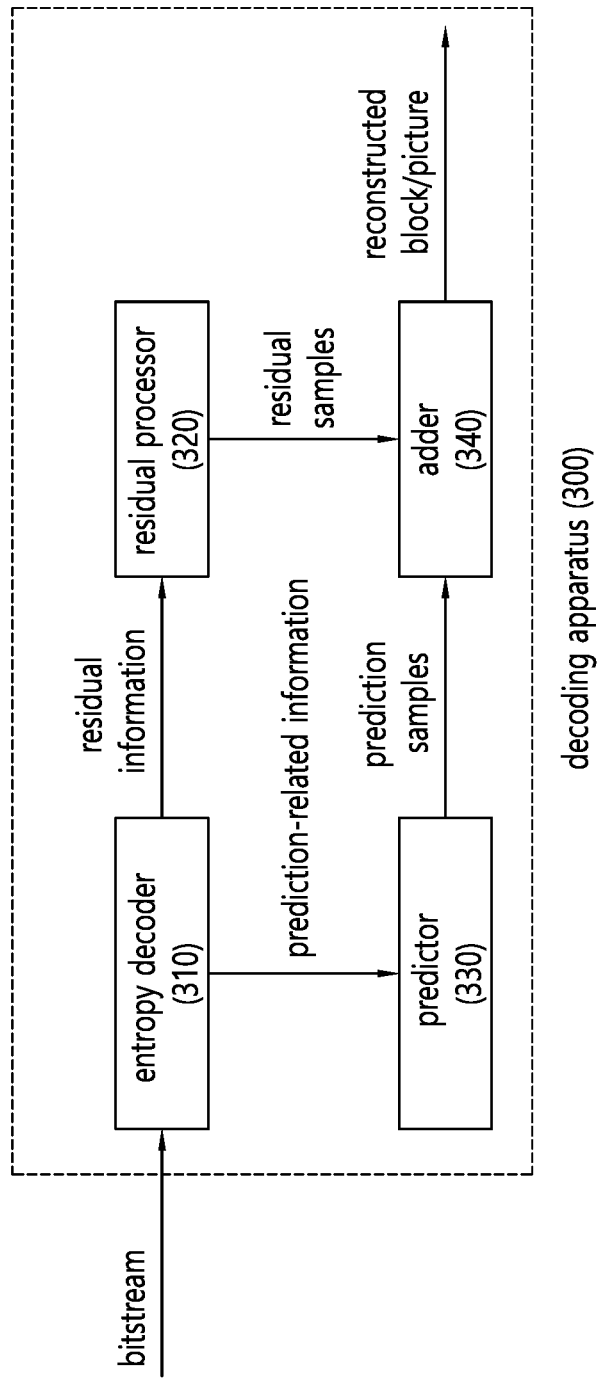

FIGS. 21 and 22 schematically represent an example of a video/image decoding method and associated components according to the embodiment(s) of this document.

The method disclosed in FIG. 21 may be performed by the decoding apparatus 300 disclosed in FIG. 3 or 22. Here, the decoding apparatus 300 disclosed in FIG. 22 is a simplified representation of the decoding apparatus 300 disclosed in FIG. 3. Specifically, step S2100 of FIG. 21 may be performed by the entropy decoder 310, the residual processor 320, the predictor 330, the adder 340, and the like disclosed in FIG. 3, and steps S2110 to S2120 may be performed by the DPB disclosed in FIG. 3. In addition, the method disclosed in FIG. 21 may be performed including the embodiments described above in this document. Accordingly, in FIG. 21, a detailed description of contents corresponding to the repetition of the above-described embodiments will be omitted or simplified.

Referring to FIG. 21, the decoding apparatus may decode slices included in the current picture (S2100).

In an embodiment, the decoding apparatus may decode (reconstruct) slices in the current picture through the above-described picture partition process, intra prediction or inter prediction, residual processing, in-loop filtering, and the like.

The decoded pictures may be used as a reference for inter prediction of a sequence picture. For this, each decoded picture may be basically inserted (stored) in the DPB. As described above, the DPB may generally be updated before decoding the current picture. When the layer associated with the DPB is not the output layer (or the DPB parameters are not associated with the output layer) but a reference layer, decoded pictures in the DPB may not be output. When the layer associated with the DPB (or DPB parameter) is the output layer, decoded pictures in the DPB may be output based on the DPB and/or the DPB parameter. At this time, it may be determined whether the decoded pictures stored in the DPB are output. Whether to output the picture may be determined by deriving the picture output flag.

The decoding apparatus may derive a picture output flag for the current picture based on all slices included in the current picture having been decoded (S2110). The decoding apparatus may determine the output for the current picture based on the picture output flag (S2120).

As described above, the picture output flag may have a value related to whether the current picture is output, and may be expressed as, for example, a PictureOutputFlag value. For example, based on a value of a picture output flag (e.g., PictureOutputFlag) being 0, the current picture may be marked as "not needed for output". Alternatively, based on the value of the picture output flag (e.g., PictureOutputFlag) being 1, the current picture may be marked as "needed for output". That is, if the value of the picture output flag (e.g., PictureOutputFlag) is 1, the current picture may be output from the DPB, while, if the value of the picture output flag (e.g., PictureOutputFlag) is 0, it may be stored or removed instead of being output from the DPB.

In an embodiment, the picture output flag (e.g., PictureOutputFlag) may be derived as a value of 0 or 1 based on at least one of the following conditions.

Based on the first condition that a value of a syntax element related to video parameter set (VPS) ID is greater than 0 and a current layer is not an output layer, the value of the picture output flag (e.g., PictureOutputFlag) is derived as 0. Here, the syntax element related to the VPS ID may be an sps_video_parameter_set_id syntax element, and may be signaled from the above-described sequence parameter set (SPS). For example, when the value of sps_video_parameter_set_id is greater than 0, the value of sps_video_parameter_set_id may represent the value of a VPS ID (e.g., vps_video_parameter_set_id) that is identification information for a video parameter set (VPS). The existence of the VPS may be an option in the case of a bitstream that is a single layer.

Based on the second condition that the current picture is a random access skipped leading (RASL) picture and NoOutputBeforeRecoveryFlag of an associated intra random access point (TRAP) picture is 1, the value of the picture output flag (e.g., PictureOutputFlag) may be derived as 0. In this connection, the NoOutputBeforeRecoveryFlag may be flag information indicating whether decoded pictures of pictures from a gradual decoding refresh (GDR) picture before a recovery point picture in picture order count (POC) order or in decoding order can be output. For example, it may be determined that (decoded) pictures between the GDR picture and the recovery point picture are not output, and in this case, the value of NoOutputBeforeRecoveryFlag may be set to 1. Additionally, it may be determined that the (decoded) GDR picture is not output, and in this case, the value of NoOutputBeforeRecoveryFlag may be set to 1. However, it may be determined that the (decoded) recovery point picture is output, and in this case, the value of NoOutputBeforeRecoveryFlag may be set to 0. That is, in the case of pictures having POCs from the POC of the GDR picture to POC before the recovery point POC, the value of NoOutputBeforeRecoveryFlag may be determined to be 1.

Based on the third condition that the current picture is a gradual decoding refresh (GDR) picture with NoOutputBeforeRecoveryFlag equal to 1, or a recovery picture of a GDR picture with NoOutputBeforeRecoveryFlag equal to 1, the value of the picture output flag (e.g., PictureOutputFlag) may be derived as 0.

Otherwise, when at least one of the first condition, the second condition, and the third condition is not satisfied, the value of the picture output flag (e.g., PictureOutputFlag) may be derived as the value of the picture output related syntax element to be signaled. In this case, the picture output related syntax element to be signaled may be ph_pic_output_flag, as shown in Table 4 above. The ph_pic_output_flag syntax element may be information affecting the output and removal process of the decoded picture, and, for example, if the value of ph_pic_output_flag is 1, it may indicate that the decoded picture is output, while, if the value of ph_pic_output_flag is 0, it may indicate that the decoded picture is not output.

The process of deriving the picture output flag (e.g., PictureOutputFlag) in the above-described embodiment is a process that is applied based on the conditions according to the specification algorithm disclosed in Table 4 above. In another embodiment, a value of a picture output flag (e.g., PictureOutputFlag) may be derived based on conditions according to the specification algorithm disclosed in Table 3 above.

Also, in an embodiment, with respect to a bitstream that is a single layer, the encoding apparatus may also derive a picture output flag (e.g., PictureOutputFlag) for the current picture based on all slices included in the current picture having been decoded. Also, in an embodiment, even in the case of a bitstream supporting a multi-layer, a picture output flag (e.g., PictureOutputFlag) may be derived after all slices in the current are decoded in the same way as in a single layer. In this way, when the picture output flag (e.g., PictureOutputFlag) is derived after all slices in each picture have been decoded, regardless of whether the bitstream is a single layer or a multi-layer, there is no need to unnecessarily perform the process of deriving the output related information (i.e., the picture output flag) regardless of whether the bitstream is a single layer or a multi-layer. In addition, there is no need to unnecessarily update the output related information (i.e., the picture output flag) regardless of whether the picture is the last picture in the access unit (AU).

When the value of the picture output flag (e.g., PictureOutputFlag) derived as described above is 1, the (decoded) current picture may be output according to the output order or the POC order. Alternatively, when the value of the output flag (e.g., PictureOutputFlag) is 0, the (decoded) current picture is not output.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present disclosure may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

Further, the decoding apparatus and the encoding apparatus to which the present document is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a virtual reality (VR) device, an augmented reality (AR: argumente reality) device, a video telephony video device, a transportation means terminal (e.g., a vehicle (including an autonomous vehicle) terminal, an aircraft terminal, a ship terminal, etc.) and a medical video device, and may be used to process a video signal or a data signal. For example, the over the top (OTT) video device may include a game console, a Blu-ray player, an Internet access TV, a home theater system, a smart phone, a tablet PC, a digital video recorder (DVR) and the like.

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 23:
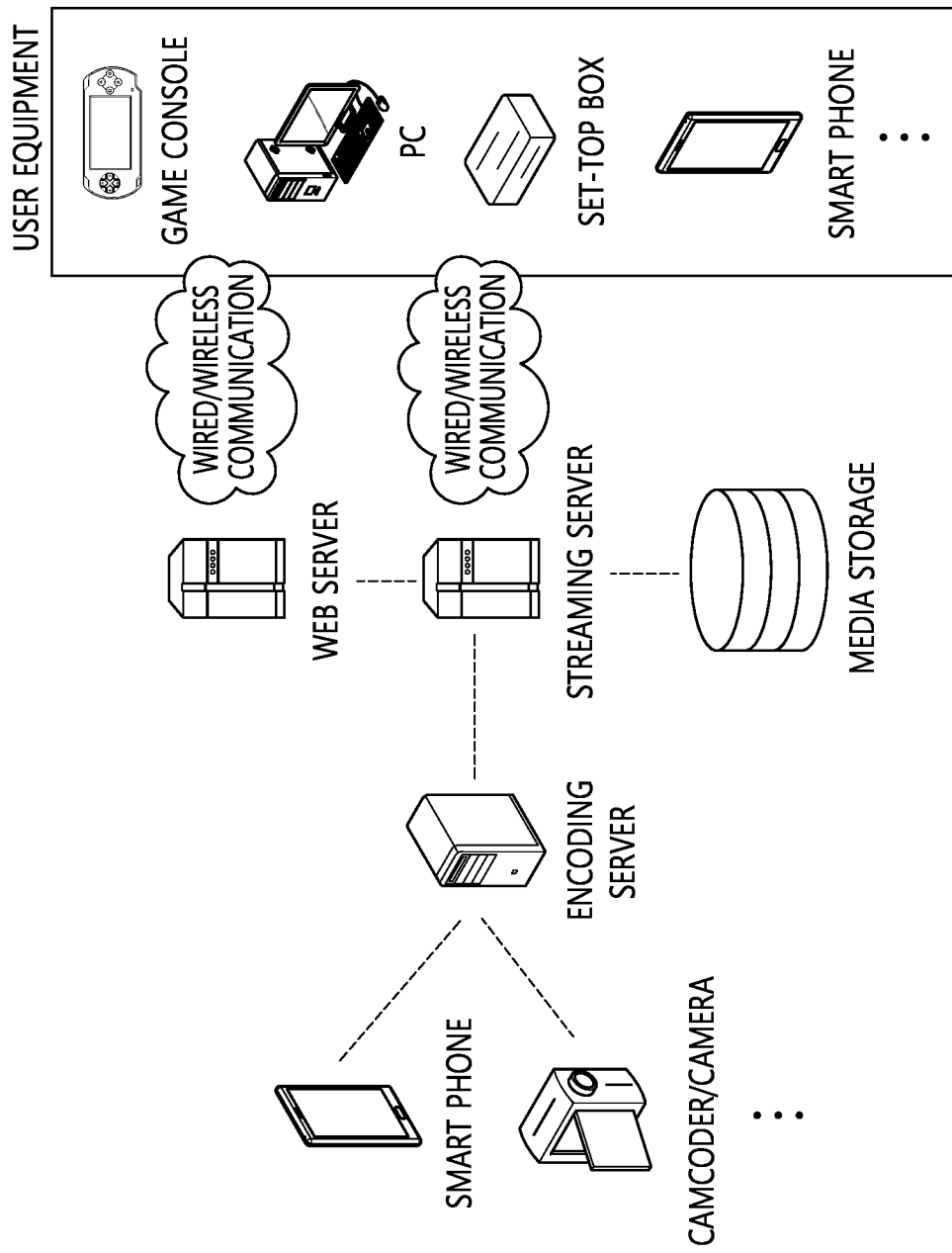
FIG. 23 illustrates an example of a content streaming system to which embodiments disclosed in the present document are applicable.

FIG. 23 represents an example of a contents streaming system to which the embodiment of the present document may be applied.

Referring to FIG. 23, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present document can be combined in a various way. For example, technical features in method claims of the present document can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding method performed by a decoding apparatus, the method comprising:
   decoding slices included in a current picture;
   deriving a picture output flag for the current picture, based on all of the slices included in the current picture having been decoded; and
   determining output for the current picture based on the picture output flag,
   wherein the picture output flag has a value related to whether the current picture is output,
   wherein based on a value of the picture output flag being 0, the current picture is marked as "not needed for output",
   wherein based on the value of the picture output flag being 1, the current picture is marked as "needed for output", and
   wherein based on a first condition that a value of a syntax element related to video parameter set (VPS) ID is greater than 0 and a current layer is not an output layer, the value of the picture output flag is derived as 0.

2. The method of claim 1, wherein with respect to a bitstream having a single layer, the picture output flag for the current picture is derived based on all of the slices included in the current picture having been decoded.

3. The method of claim 1, wherein based on a second condition that the current picture is a random access skipped leading (RASL) picture and NoOutputBeforeRecoveryFlag of an associated intra random access point (IRAP) picture is 1, the value of the picture output flag is derived as 0, and
   wherein the NoOutputBeforeRecoveryFlag is flag information indicating whether decoded pictures of pictures from a gradual decoding refresh (GDR) picture before a recovery point picture in picture order count (POC) order or in decoding order can be output.

4. The method of claim 1, wherein based on a third condition that the picture is a gradual decoding refresh current (GDR) picture with NoOutputBeforeRecoveryFlag equal to 1, or a recovery picture of a GDR picture with NoOutputBeforeRecoveryFlag equal to 1, the value of the picture output flag is derived as 0.

5. The method of claim 1, wherein based on the first condition not being satisfied, the value of the picture output flag is derived as a value of a picture output related syntax element to be signaled.

6. The method of claim 3, wherein based on the second condition not being satisfied, the value of the picture output flag is derived as a value of a picture output related syntax element to be signaled.

7. The method of claim 4, wherein based on the third condition not being satisfied, the value of the picture output flag is derived as a value of a picture output related syntax element to be signaled.

8. An image encoding method performed by an encoding apparatus, the method comprising:
   decoding slices included in a current picture;
   deriving a picture output flag for the current picture, based on all of the slices included in the current picture having been decoded;
   determining output for the current picture based on the picture output flag; and
   encoding image information for the current picture,
   wherein the picture output flag has a value related to whether the current picture is output,
   wherein based on a value of the picture output flag being 0, the current picture is marked as "not needed for output",
   wherein based on the value of the picture output flag being 1, the current picture is marked as "needed for output", and wherein based on a first condition that a value of a syntax element related to video parameter set (VPS) ID is greater than 0 and a current layer is not an output layer, the value of the picture output flag is derived as 0.

9. The method of claim 8, wherein with respect to a bitstream having a single layer, the output flag for the current picture is derived based on all of the slices included in the current picture having been decoded.

10. The method of claim 8, wherein based on a second condition that the picture current is a random access skipped leading (RASL) picture and NoOutputBeforeRecoveryFlag of an associated intra random access point (IRAP) picture is 1, the value of the picture output flag is derived as 0, and wherein the NoOutputBeforeRecoveryFlag is flag information indicating whether decoded pictures of pictures from a gradual decoding refresh (GDR) picture before a recovery point picture in picture order count (POC) order or in decoding order can be output.

11. The method of claim 8, wherein based on a third condition that the picture is a gradual refresh picture current decoding (GDR) with NoOutputBeforeRecoveryFlag equal to 1, or a recovery picture of a GDR picture with NoOutputBeforeRecoveryFlag equal to 1, the value of the picture output flag is derived as 0.

12. The method of claim 8, wherein based on the first condition not being satisfied, the value of the picture output flag is derived as a value of a picture output related syntax element to be signaled.

13. The method of claim 10, wherein based on the second condition not being satisfied, the value of the picture output flag is derived as a value of a picture output related syntax element to be signaled.

14. The method of claim 11, wherein based on the third condition not being satisfied, the value of the picture output flag is derived as a value of a picture output related syntax element to be signaled.

15. A non-transitory computer-readable storage medium for storing a bitstream generated by the image encoding method of claim 8.

16. A method for transmitting data for image information comprising:

decoding slices included in a current picture;

deriving a picture output flag for the current picture, based on all of the slices included in the current picture having been decoded;

determining output for the current picture based on the picture output flag; and encoding the image information for the current picture, wherein the picture output flag has a value related to whether the current picture is output, wherein based on a value of the picture output flag being 0, the current picture is marked as "not needed for output", wherein based on the value of the picture output flag being 1, the current picture is marked as "needed for output", and wherein based on a first condition that a value of a syntax element related to video parameter set (VPS) ID is greater than 0 and a current layer is not an output layer, the value of the picture output flag is derived as 0.

\* \* \* \* \*